(12) United States Patent
Amano

(10) Patent No.: US 6,519,545 B1
(45) Date of Patent: Feb. 11, 2003

(54) MATHEMATICAL RELATION IDENTIFICATION APPARATUS AND METHOD

(75) Inventor: Kageaki Amano, Yokohama (JP)

(73) Assignee: Amano Koki Kabushiki Kaisha (JP)

( * ) Notice: Subject to any disclaimer, the term of this patent is extended or adjusted under 35 U.S.C. 154(b) by 0 days.

(21) Appl. No.: 09/622,435

(22) PCT Filed: Dec. 22, 1997

(86) PCT No.: PCT/JP97/04732

§ 371 (c)(1),
(2), (4) Date: Jan. 31, 2001

(87) PCT Pub. No.: WO99/32992

PCT Pub. Date: Jul. 1, 1999

(51) Int. Cl.$^7$ ............................................... G06M 11/04
(52) U.S. Cl. ..................... 702/127; 382/141; 356/394; 600/300; 600/558; 702/32; 707/7
(58) Field of Search .................. 702/5, 36, 42, 702/168, 127; 708/146, 400, 401, 402, 404; 324/76.21, 300, 306, 307; 382/248, 251; 704/210, 215, 221, 229, 230, 240; 707/4

(56) References Cited

U.S. PATENT DOCUMENTS

| | | | | |
|---|---|---|---|---|
| 4,360,274 A | * | 11/1982 | Norton-Wayne | 356/394 |
| 4,514,826 A | * | 4/1985 | Iwata et al. | 707/7 |
| 5,911,001 A | * | 6/1999 | Kawada | 382/141 |
| 6,012,019 A | * | 1/2000 | Saby | 702/32 |
| 6,093,153 A | * | 7/2000 | Levin | 600/558 |
| 6,340,346 B1 | * | 1/2002 | Almog et al. | 600/300 |

FOREIGN PATENT DOCUMENTS

| | | |
|---|---|---|
| JP | A-57-011665 | 1/1982 |
| JP | A-61-294312 | 12/1986 |
| JP | 63-167907 | 7/1988 |
| JP | A-4-270447 | 9/1992 |
| JP | A-5-81232 | 4/1993 |
| JP | A-5-266063 | 10/1993 |
| JP | A-5-334431 | 12/1993 |

OTHER PUBLICATIONS

J.C. Miller and J.N. Miller, 1988, Statistics for Analytical Chemistry, Second Edition.
Yasukazu Yosizawa and Kyouritsu Shuppan, Nov. 1, 1989, New theory of errors, a method analysis of measured data, 4$^{th}$ Edition 1995.
Tooru Nakagawa, et al., May 30, 1982, Analysis of measured data using the least square method, Tokyo University Press, 10$^{th}$ Editionn, Feb. 5$^{th}$, 1999.

* cited by examiner

Primary Examiner—John S. Hilten
Assistant Examiner—John Le
(74) Attorney, Agent, or Firm—McGlew and Tuttle, P.C.

(57) ABSTRACT

A mathematical relation between base variables (x1, x2, ..., xp), when a set of input data d is composed of p base variables (x1, x2, ..., xp), and a plurality of data sets d (i) of such data set d is inputted, the data sets d(i) are distinguished by an input data distinguishing parameter i. When victors in a q dimensional space, mapped from the input data through q base functions (f1, ..., fq), form a plane, a mathematical relation can be a linear combination of the base functions. A set of base functions (f1, ..., fq) are prepared. Sets of the values F(i)=(F1i, ..., Fqi) of the base functions corresponding to the input data d (i) are acquired. The sets F(i) are considered points in a q dimensional space. Direction cosine of a mapping plane is acquired through cofactors of a determinant of these points, or by solving an eigenvalue problem for determining a plane, the square sum of the perpendicular lines from these points to the plane is minimum. When the direction cosine of the plane is (L1, ..., Lq), the following mathematical relation is outputted:

$$q\Sigma(Lk \times fk)=0 \quad k=1.$$

11 Claims, 7 Drawing Sheets

$d(1) = (x_1\ y_1\ z_1\ t_1)$
$d(2) = (x_2\ y_2\ z_2\ t_2)$
- - -

$d(1) = (P_1, T_1, X_1 Y_1 Z_1)$ $d(2) = (P_2, T_1, X_1 Y_3 Z_3)$

- - - - - - - - - - - - - - -

MATHEMATICAL RELATION IDENTIFICATION APPARATUS AND METHOD

TECHNICAL FIELD

The present invention relates to an apparatus for identifying a mathematical relation between variables of measured data. An apparatus for identifying a mathematical relation identifies a mathematical relation between numerical data of, for example, a form, trajectory, etc. The extrapolation, interpolation, storing of such data can be facilitated For example, the apparatus can be used as follows:

1) Expression of a shape of an object

In a designing of a shape of an automobile, data of a shape of an object can be stored as a set of numerical data. However, when a shape can be expressed as a mathematical expression including a plurality of parameters, data can be easily extrapolated and interpolated. And new shape can be easily obtained, by varying the value of some parameters. And a computer analysis of the new shape, for example, aerodynamical resistance, etc, becomes easy. Further, a preparation of a mold for fabrication of an object having the corresponding shape, using a numerically controlled working machine, becomes easy.

In a shoe shop, even when a client found a pair of shoes, the size of which is identical to the size of his feet, and the design of which is acceptable, if the pair of shoes do not fit actually to his feet, he will not buy the pair of shoes. There are many variety in the shape of foot of human being. Therefore, sizes including small number of measured values of a foot are not sufficient to express a shape of a foot of human being. No apparatus or method is known, which can determine values of parameters of a mathematical expression, representing a complex shape of an object, for example, a shape of shoe or a shape of foot of human being.

2) Identification of a mathematical relation between variables of experimental data, when the mathematical relation shall be expressed by a non-linear function:

Even when a mathematical relation between obtained data is non-linear, data are often extrapolated and interpolated, using a linear approximation. However, when a mathematical relation between the variables of data can be identified, data can be exactly extrapolated and interpolated, without using linear approximation.

Assuming that a food is produced from stuffs A, B. And a characteristic value of the food X, for example, concentration Z of an amino acid, is a function of the concentration X, Y of the stuffs A, B, the pressure P and temperature T of a treatment. When the mathematical relation between these variables can be identified, it becomes easy to obtain the most preferable values of the X, Y. P, T, for getting the most appropriate concentration Z, using the mathematical relation. Thus the development of a new product can be facilitated.

For example, assuming that the relation between the variables X, Y, P, T, Z is as follow, no apparatus and method is known, which can determine the coefficients K0, K1, K2, K3, by small times of experiments.

$$Z/(X \cdot Y) = K0 + K1 \cdot P1 \cdot K2T + K3 \cdot X$$

3) Representation of a trajectory of a moving object: For example, it is said that the trajectory of golf club head of a professional golfer is approximately a plane, on the other hand, the trajectory of golf club head of an ordinal amateur is not a plane. The trajectory of golf club head is not a line, thus the mathematical expression of the trajectory of golf club head is not simple. An apparatus for identifying the mathematical relation identifies the mathematical relation of a trajectory of such a moving object so as to analyze the trajectory.

Trajectories of an airplane flying around over an airport, a ship sailing on the ocean, or a car running on the road, are not linear, but the changing rate of the direction of the movement is slow. When the mathematical relation of the motion of such moving objects can be identified, it is possible to estimate the possibility of a collision of such moving objects.

BACKGROUND

Prior Art

Some methods for identifying the mathematical relation between measured values are proposed. For example, a least square root method for determining the factors a and b in a linear relation y=ax+b is widely employed, under the assumption that a linear relation y=ax+b stands between the input data. Also a least square root method after a logarithmic transformation is widely employed.

Methods for identifying the mathematical relation between the measured data are explained compactly in "Statistics for analytical chemistry" by J. C. Miller/J. N. Miller, which is translated into Japanese by Munemori Makoto and published in Japan from Kyouritu Shuppan in 1991.

Japanese patent application JP-5-334431-A discloses an apparatus for giving a mathematical function, which approximates data of points on a line This apparatus is not applicable, when the data is not data of points on a line, or when the data is data of over three dimension.

Japanese patent application JP-5-266063-A discloses an apparatus for interpolating data in n dimension space, using a super surface in a (n+1) dimension space. This apparatus can interpolate data, but does not identify the mathematical relation of the data.

Object of the Invention

An object of the present invention is to propose an apparatus and method for outputting a mathematical relation between base variables (x1, x2, ..., xp), when a set of input data d is comprised of p base variables (x1, x2, ..., xp), and a plurality of data sets d(i) of such a data set d are inputted, where the symbols "i" is a parameter for distinguishing the sets of data set.

Disclosure of Invention

Glossary

The meaning of symbols and terms used in this Specification and the Claims are explained, before explaining the present invention. Symbol "^" is a power (far example, (-2)^3=-8). Power is expressed also using a suffix (for example, (-2)³=-8).

Symbol "." is a multiplication (for example 2·3=6). However, this symbol is abbreviated, when the meaning is obvious (for example, 2x+3y=0 means 2·x+3·y=0).

Symbol "<a·b>" is an inner product (scalar product) of vectors.

"Base variables x1, ..., xp" are names of variables of data inputted into the apparatus according to the present invention (for example coordinates x, y, z pressure p, or time t).

"Input data d" is a set of base variables (x1, x2, ... xp).

"d=(x1, ..., xp)" means that the number of the base variables of the input data d is p, and the final base variable is xp.

"Input data d(i)" is the i-th set of the input data d. Symbol "i" is called "data specifying parameter".

"xji" is the value of the j-th variable of the i-th set of data d(i).

"Mathematical function program" is a program for outputting a value corresponding to input reference values, after executing a mathematical calculation or using a table.

"An input reference and a function specifying reference": For example, a function exp(k·x) can be considered as a two variable function, in such a case, the function exp(k·x) has two input variables k and x. However, this function can be considered also as a one variable function exp(k·x). In this case, the function has an input reference x and a reference k for specifying the function. References for specifying the function are called "function specifying reference", and references as input values are called "input reference".

"Function specifying parameter m" is a parameter for specifying a mathematical function program gm.

"Base function" is a function gk in a set of mathematical function programs gm stored in a mathematical function program storing memory, and specified by the function specifying parameter (m=k). The input variables to be inputted to the input reference of the mathematical function gk are specified. The function specifying references are specified when it is necessary. When the function is a constant function, which outputs a constant value irrespectively to the input, it is not necessary to specify the input references.

"Candidate mathematical relation" is a set of base functions (f1, ..., fq).

In the present invention, a mathematical relation is identified as a linear combination of base functions.

"A temporal candidate mathematical relation" is a set of base functions selected temporarily as a candidate mathematical relation, when the most appropriate mathematical relation is sought, by changing the candidate mathematical relation.

"(f1, ..., fq)" means that the candidate mathematical relation is comprised of q base functions, and the final base function is fq.

"Vector component Fki" is a value of a base function fk, corresponding to the values of the base variable (x1, ..., xp) of the i-th input data d(i) inputted to the input reference of the base function fk.

"Vector F(i)" is a vector in a q dimensional space comprised of vector components Fki (k=1, ..., q).

"Vector component array VE_ARRAY" is a two dimensional array storing vector components Fki.

"Vector space F" is a space spanned by q dimensional vectors F(i).

"Plane" is a set of points in a q dimensional vector space, which satisfies the following relation, where the L1, L2, ..., Lq are constant (Appendix B):

$$L1 \cdot x1 + \ldots + Lq \cdot xq = 0 \tag{1}$$

"Dimension cosine" is a set of numerals (L1, ..., Lq) which satisfy the expression (1), and normalized as follows:

$$(L1)^2 + (L2)^2 + + (Lq)^2 = 1 \tag{2}$$

"Mapping plane" is a mapping of a set of input data d(i) into the vector space F, and the mapping is a plane or nearly a plane. Also, a plane the square sum of the perpendicular lines from mapped points to the plane is zero or nearly equal to zero (namely, smaller than a predetermined value$\lambda 0$), is called a mapping plane, (Appendix A).

"Plane degree index PI" is an index indicating in what degree the vectors F(1), ..., F(q) can be regarded as a plane. Plane degree index can be defined on any industrial or commercial ground (Appendix D).

"Correlation sum <a|b>" is a sum of products of a vector component Fai obtained from a base function fa and a vector component Fbi obtained from a base function fb, the sum is carried out in respect with the input data specifying parameter i (Appendix F).

$$<a|b> = \Sigma(Fai \cdot Fbi) \tag{3a}$$

The term <a|b> means also the sum of the products multiplied by a square of weight $Wi^2$:

$$<a|b> = \Sigma Wi^2 (Fai \cdot Fbi) \tag{3b}$$

"Correlation sum matrix C" is a matrix, the elements of which are correlation sums.

Means to Attain the Object

The object of the present invention is attained by the apparatus for identifying the mathematical relation according to claim 1, and the method for identifying the mathematical relation according to claim 10. The principle of the present invention is explained in Appendix A.

A series of data d(i) comprised of p basic variables xj (j=1, ..., p) are acquired by a data acquisition means. The unit of data is d(i)=(x1i, x2i, ... xpi).

A plurality of mathematical function programs gm are stored in a mathematical program storing memory A base function defining means defines a base function by specifying a specific mathematical function program gk in the mathematical function program gm in the mathematical program storing memory, by specifying the parameter (m=k), and further specifying the base variables to be inputted into the input reference of the mathematical function Also mathematical function specifying parameters are specified, when it is necessary.

A candidate mathematical relation specifying means specifies a temporal mathematical relation by specifying a set of base functions (f1, ..., fq). In this invention, the mathematical relation is identified as a combination of those base functions (f1, ..., fq) It is possible to design the candidate mathematical relation specifying means to specify a series of temporal candidate mathematical relations sequentially.

A vector component acquisition means sends the values of the basic variables to each of the input references of base functions fk (k=1, ..., q) included in the candidate mathematical relation, for each data set d(i). The vector (component acquisition means gets the output value Fki of the base functions fk and stores them into a two dimensional array. The array (is called VC_ARRAY. When the base functions are fk (k=1, ..., q), and s sets of data are sent, the vector component array VC_ARRAY is a two dimensional array of (q×s) size.

A set of Fji is considered as a vector F(i). And the values of the functions are stored in the vector component array VC_ARRAY for every vector F(i), as follows:

$$F(1)=(F11, F21, \ldots, Fq1)$$

$$F(2)=(F12, F22, \ldots, Fq2)$$

...

When q sets of data in the array VE_ARRAY are considered as a coordinate of points P(i) in a q dimensional space F, and if the combination of the candidate mathematical relation is correct, the points shall be found in a plane (mapping plane) in the vector space F. If the candidate mathematical relation is approximately correct, those points shall distribute near to a plane (mapping plane). As explained in Appendix C, the mapping plane can be determined from a determinant of Fji, or can be determined as a plane, the square sum of perpendicular lines from the points P(i) to the plane is the minimum.

A direction cosine acquisition means calculates and outputs the direction cosine (L1, ..., Lq) of a plane on which the points P(i) (i=1, ..., q) are found, or a plane, the square sum of perpendicular lines from the points P(i) to the plane are the minimum.

A mathematical relation outputting means identifies the mathematical relation as a combination of the base functions fk (k=1, ..., q), where the combination coefficients of the base functions are the direction cosine. The mathematical relation outputting means outputs the mathematical relation in a form of the following linear combination or a mathematical relation deduced from it:

$$\sum_{k=1}^{q} (Lk \cdot fk) = 0 \qquad (4)$$

According to an embodiment, the direction cosine acquisition means acquires the direction cosine, using a cofactor of a determinant V of a set of values of mathematical functions Fji. The ground of this method is explained in Appendix C.

According to another embodiment, the direction cosine acquisition means acquires the direction cosine from an eigenvector of a correlation sum matrix obtained from an array of sets of the values of base functions. The ground of this method is explained in Appendix F.

In another embodiment, the base function defining means defines a plurality of candidate mathematical relations. And so far as the eigenvalue $\lambda$ calculated by the direction cosine acquisition means is not smaller than a predetermined value, another candidate mathematical relation is set as a new temporal candidate mathematical relation to repeat to try to acquire a new eigenvalue, untill the eigenvalue becomes smaller than the predetermined value. As a result, an appropriate mathematical relation can be acquired automatically.

In another embodiment, the mathematical relation identifying apparatus is incorporated in an apparatus for interpolating or extrapolating data. When an empirical formula of a system includes a plurality of parameters is required, a candidate mathematical relation of a combination of a base functions is assumed, on an empirical or theoretical ground. The empirical formula can be identified, by acquiring the direction cosine, using the apparatus according to the present invention and estimating the validity of the expression.

In another embodiment, the apparatus for identifying a mathematical relation is incorporated in an apparatus for measuring a trajectory. At first infinite sets of the coordinates of points on a trajectory of a moving object (for example, golf club head) is acquired. Previously a candidate mathematical relation is assumed on an empirical or theoretical ground. Then the direction cosine is acquired using the apparatus according to the present invention. An empirical formula of a trajectory can be obtained from the direction cosine, after estimating the validity.

In another embodiment, the apparatus for identifying a mathematical relation is incorporated in an apparatus for measuring exterior or interior form of an object, (for example, face, foot, or shoe). At first, coordinates of infinite sets of points on the surface of an object is acquired. Previously a candidate mathematical relation is assumed on an empirical or theoretical ground. Then, the direction cosine is acquired, using the apparatus according to the present invention. An empirical formula representing the form can be obtained from the direction cosine, after estimating the validity.

The present invention can be realized as a memory media, which can be read out by a computer, in which the main part of the invention according to claim 1 is coded as software.

An embodiment of the present invention is a method corresponding to the apparatus for identifying a mathematical relation according to claim 1.

BEST MODE FOR CARRYING OUT THE INVENTION

Figure 1:
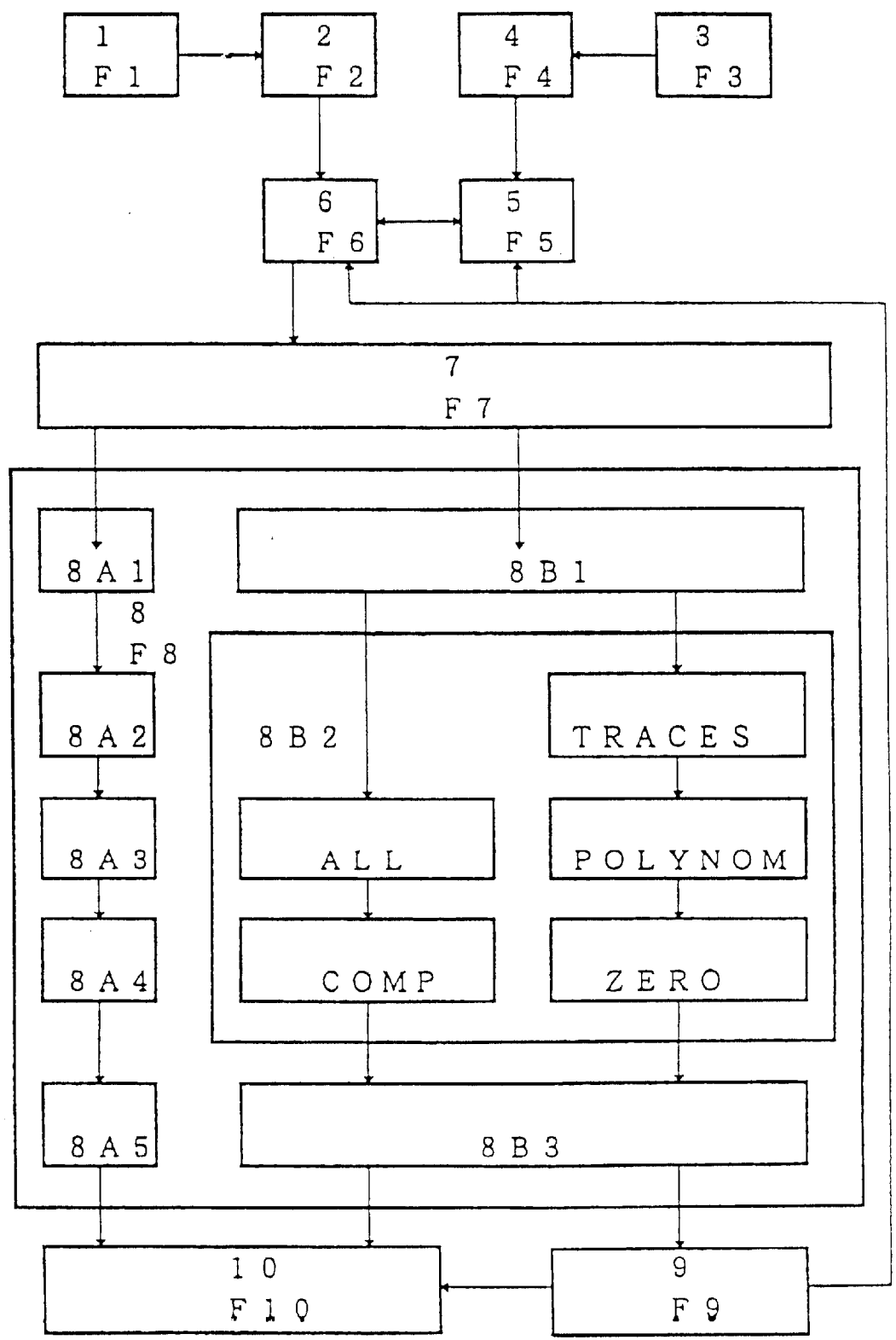
FIG. 1 is a block diagram of an apparatus for identifying a mathematical relation according to one of the best mode of the present invention.
Figure 2:
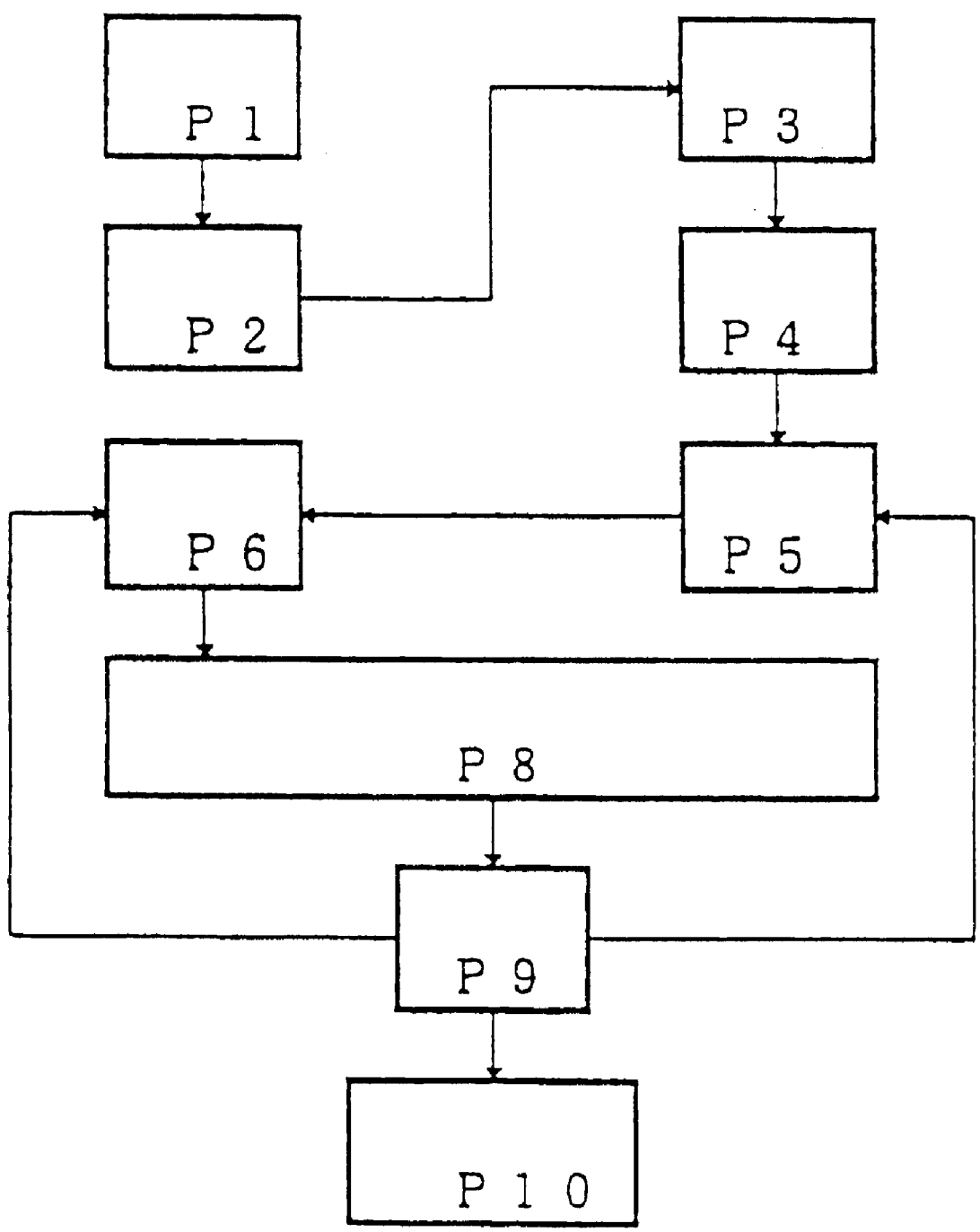
FIG. 2 is a flow chart showing the flow of the procedure in the apparatus and method for identifying a mathematical relation according to the present invention.

FIGS. 1 and 2 show the apparatus and the method of the present invention.

A Data Acquisition Means 1 and Data Acquisition Procedure P1

A data acquisition means 1 in the apparatus for identifying a mathematical relation acquires data from a (not shown) data outputting means in a preceding stage. Examples of the data outputting means are a keyboard of a computer for inputting a numerical data; a position coordinate specifying device for specifying a coordinate of a position specified by a cursor and/or mouse device in a display of a computer; a position data acquisition means for acquiring data from stylus for measuring a position coordinate of a point on the surface of a model object in a teaching-in type working machine; a position coordinate detecting means, which gets image information of a moving body using a CCD camera and transforms the image information to data of a position coordinate; and a position coordinate detecting means for acquiring position coordinate of a moving body using a radar The data acquisition means acquires a series of data d(i). Each data d(i) is comprised of p basic variables xj (j=1, ..., p). FIGS. 3–7 show examples of data d(i) to be acquired by the data acquisition means.

FIGS. 3(a), (b) and (c) show examples of foot. In this example, 2 dimensional coordinates of points P1, ..., P14 are measured for specifying the form of the foot. In this case, each data d is comprised of a two basic variables (x, y) (d=(x, y)). If it is necessary, the data acquisition means can have a coordinate transforming means for transforming an orthonormal coordinate (x, y) to a polar coordinate (r, 0), the origin of which is a specified point, for example a point O in the figure separated distances $x_0$ and $y_0$ from the most inner side and the most rear side of the foot, respectively.

The data acquisition means (1) can be designed to measure a three dimensional coordinate (x, y, z) of a point of a foot. In this case, each data d(i) is comprised of three basic variables (x, y, z). If it is necessary, the data acquisition means (1) can have a coordinate transforming means for transforming the three dimensional coordinate to a cylindrical coordinate (r, θ, z), the center line of which is a vertical line (z axis), for example. In the example shown in FIG. 4, two dimensional coordinates of points P1, ..., P14 on in interior surface of shoe are measured. In this case, each data d(i) is comprised of a two basic variables (x, y) (d=(x, y)). The data acquisition means (1) can be designed to measure a three (dimensional coordinate (x, y, z) of points of a foot. In this case, each data d(i) is comprised of three basic variables.

Figure 3:
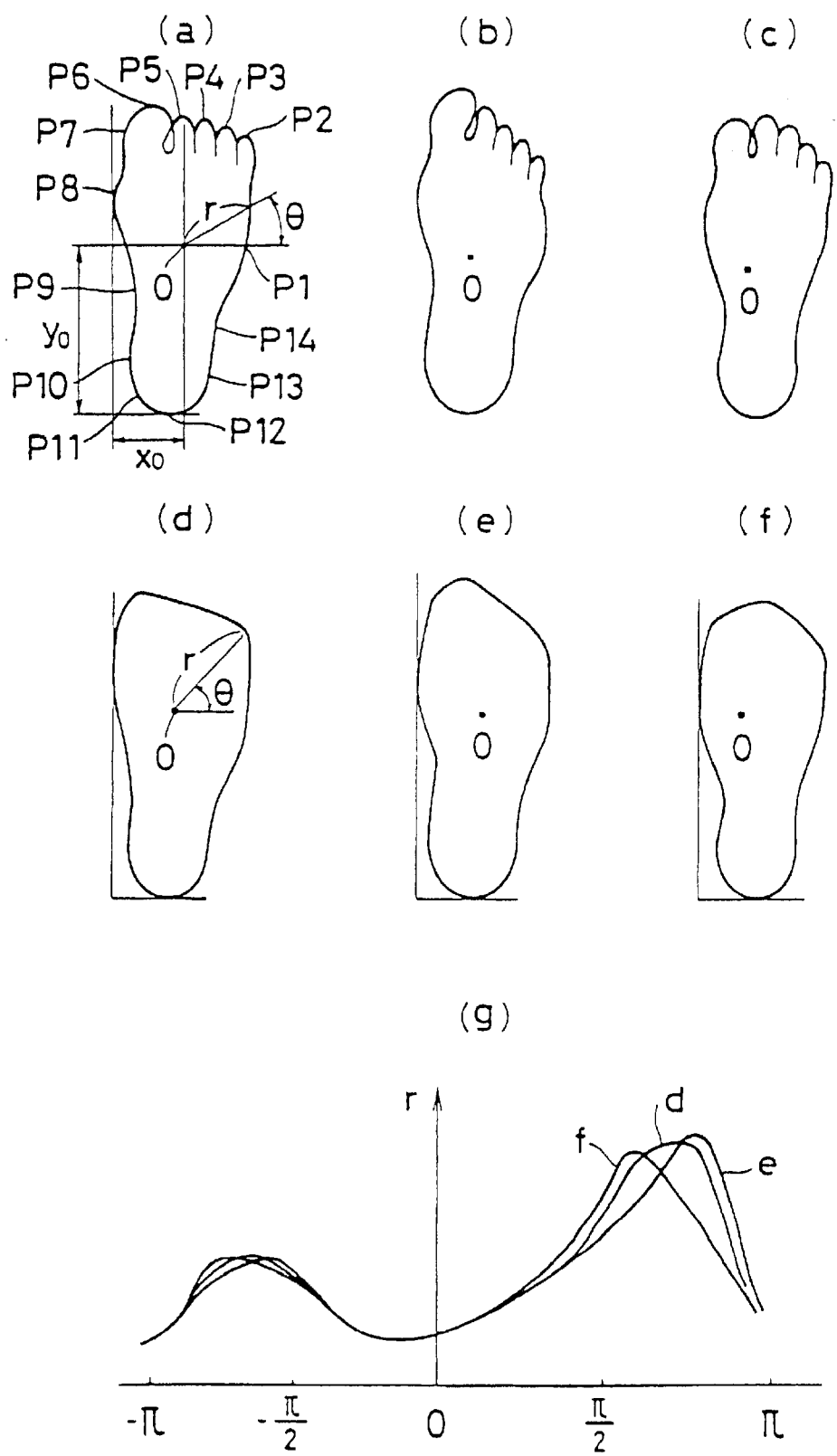
FIG. 3 shows an application for identifying the form of a human foot
Figure 4:
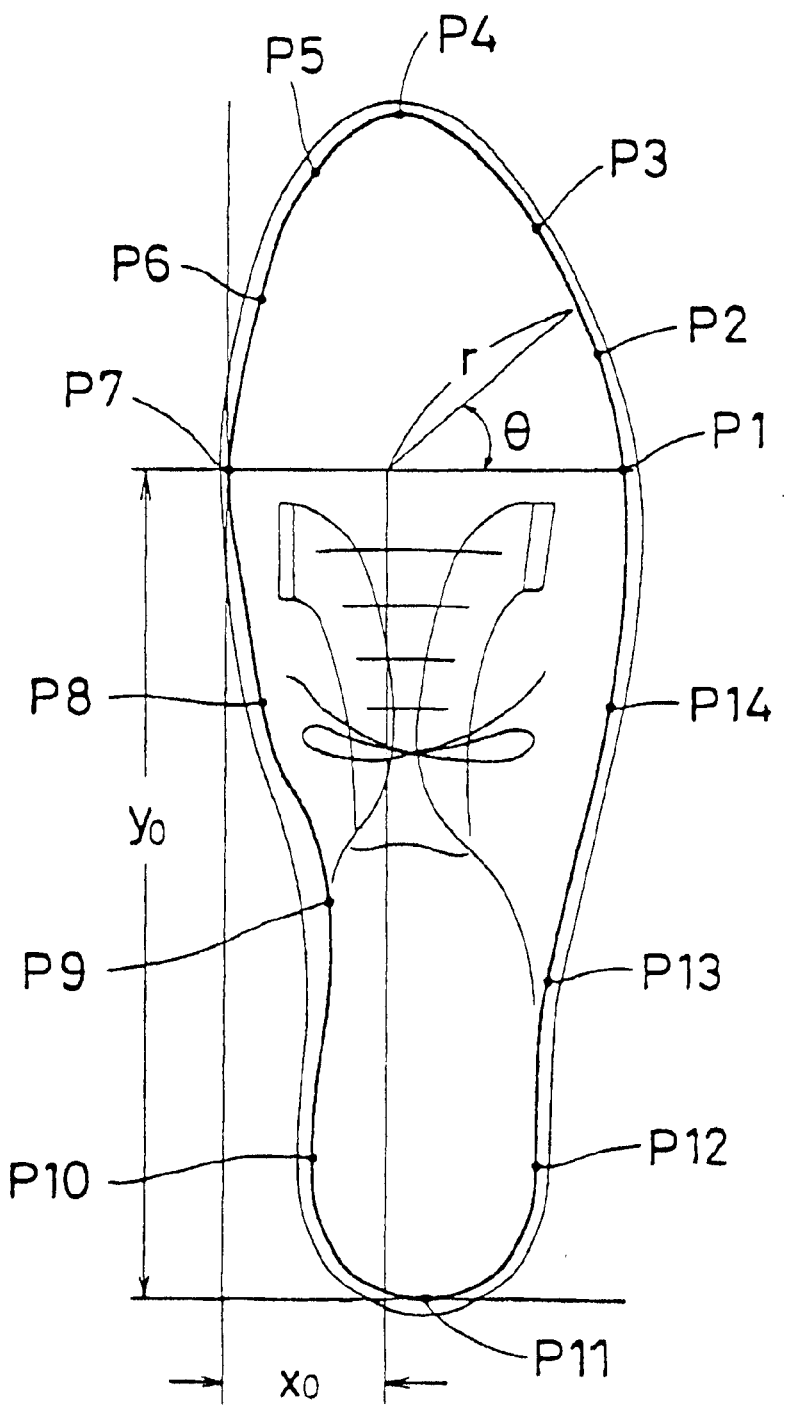
FIG. 4 shows an application for identifying the form of the interior of a shoe.

If it is necessary, the data acquisition means can have a coordinate transforming means for transforming an orthonormal coordinate (x, y) to a polar coordinate (r, E), or to a cylindrical coordinate (r, θ, z), similarly as the case of FIG. 3.

Figure 5:
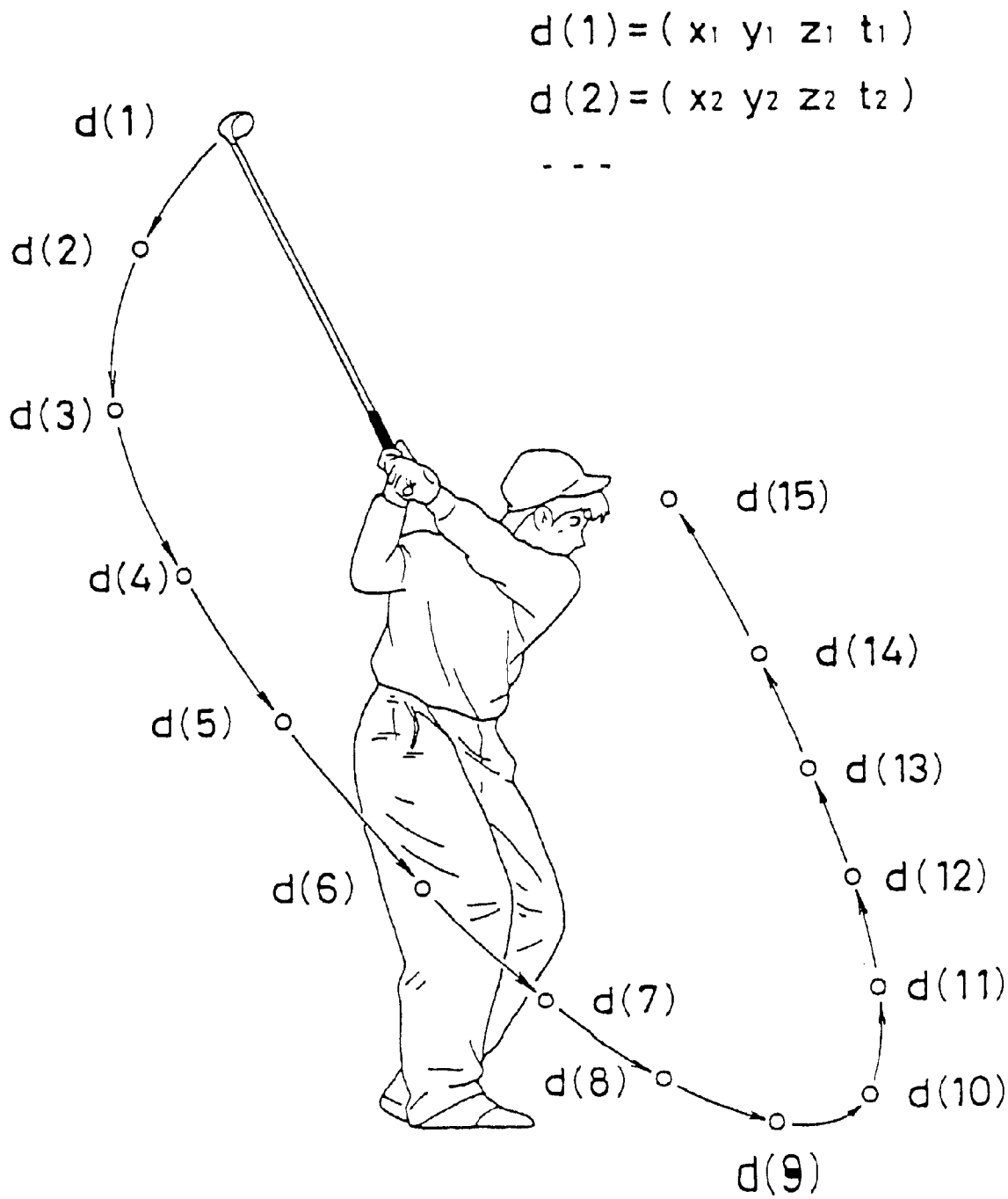
FIG. 5 shows an application for identifying the trajectory of a golf club head.

In the example shown in FIG. 5, coordinates of points (for example, 15 points) on a trajectory of a golf club head are measured as a function of time t. Each data d(i) is comprised of four basic variables (t, x, y, z).

Figure 6:
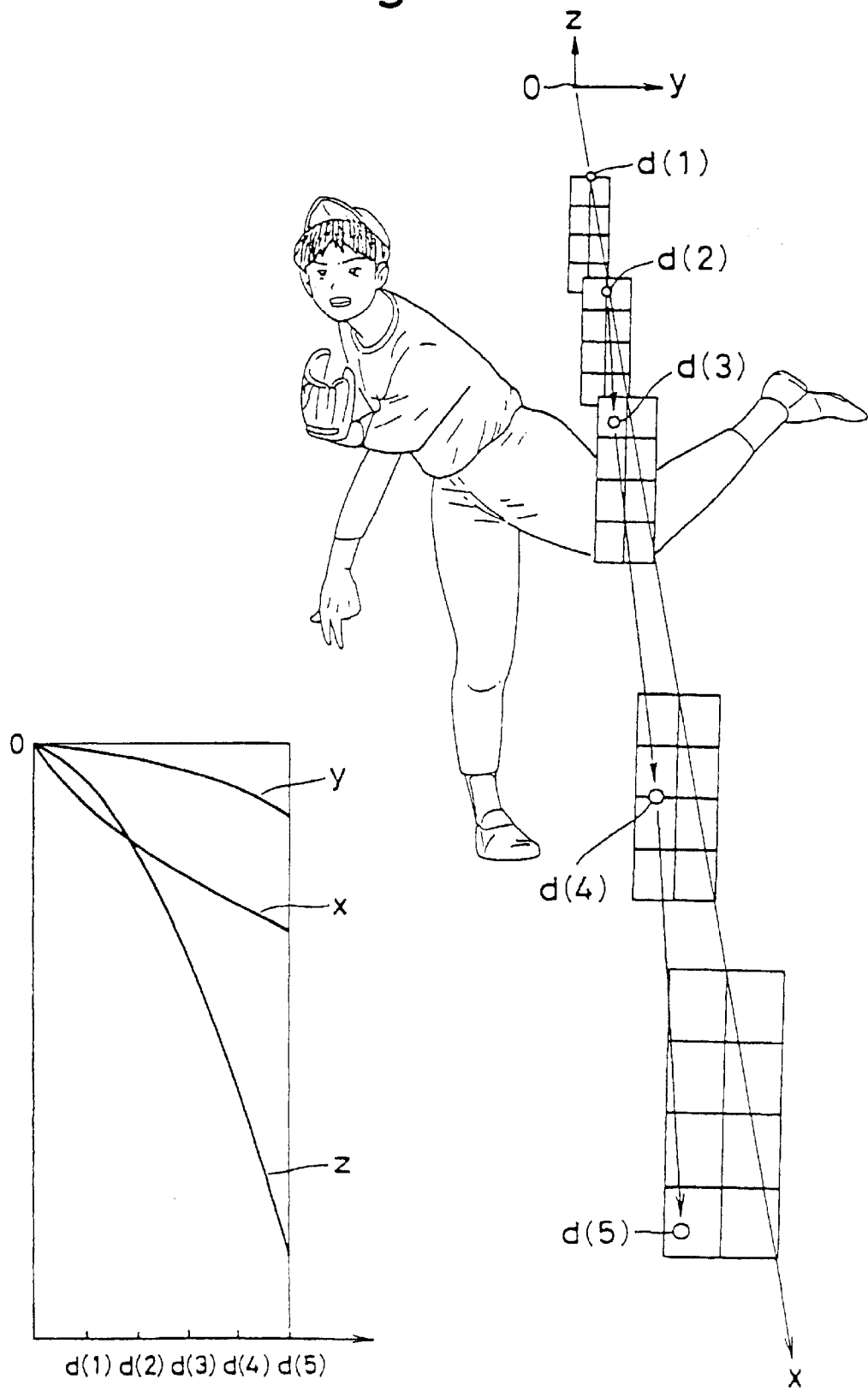
FIG. 6 shows an application for identifying the trajectory of a ball thrown by a pitcher.

In the example shown in FIG. 6, coordinates of points (for example, 5 points) on a trajectory of a ball thrown by a pitcher are measured as a function of time t. Each data d(i) is comprised of four basic variables (t, x, y, z).

Figure 7:
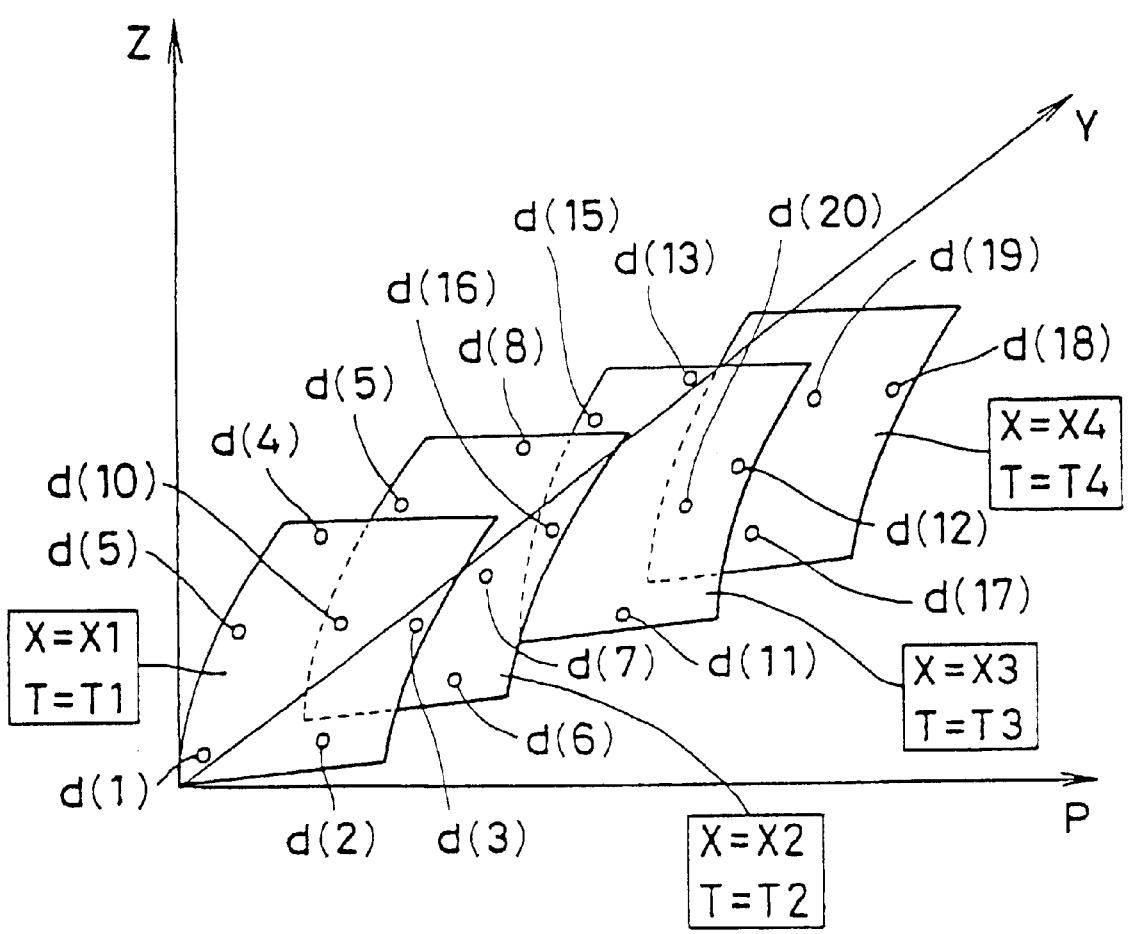
FIG. 7 shows an application for identifying a relation between a pressure P, temperature T, and concentrations X, Y, and Z.

The example shown in FIG. 7 is a case to study a relation between a pressure P, temperature T, concentration X of a component A, concentration Y of a component B and concentration Z of a component C Data (P, T, X, Y, Z) are measured at several fixed values of X and T. In the figure, some curved surfaces representing relations between P, X, Z at fixed values of the parameters X and T are shown. The data acquisition means 1 acquires data (P, T, X, Y. Z) at points d(1), ..., d(20) on the curved surface. In this case, each data d(i) is comprised of five basic variables.

The data acquisition means (1) can be realized as a file (F1) of a data acquisition program.

B. Input Data Array Forming means 2 and Data Array Forming Procedure P2

It is preferable to store the series of data d(i) in a data array DATA_ARRAY in an input data memory. The data unit in it is a set of data d(i). When s sets of data d(i) (i= 1, ..., s) are acquired, the data array DATA_ARRAY is a two dimensional array, and the size of the array is (p×x). For FIGS. 3 and 4, s=14. And for FIGS. 5, 6, 7, respectively, s=15, s=5 and s=20.

The data array forming means can be realized as a file (F2) of a data array forming program. However, the forming of data array DATA_ARRAY is not inevitable. It is possible to design to send the data acquire by the data acquisition means 1 directly to a vector component acquisition means 6, which will be explained hereinafter.

C. Mathematical Function Program Forming Means 3 and Mathematical Program Storing Procedure P3

Mathematical function program are formed by combining a general purpose mathematical function and temporal input references IN(1), IN(2), ... etc. The general purpose mathematical functions include, for example functions for, addition, subtraction, multiplication, division, power, exponential function, logarithm function, trigonometric function, and a specially programmed functions (for example, Bessel's function). Depending on the mathematical function, some mathematical function specifying reference shall be specified for determining a mathematical function program.

The mathematical function programs will be stored in a mathematical function program memory. The number of the temporal input reference variables depends upon the mathematical function.

The mathematical function program can be realized as a file F3 of list of formed program list or a program for forming a mathematical program.

For example, a mathematical function program g= IN(1)·IN(2) can be defined, by combining a multiplication function incorporated in a computer and two temporal input reference variables IN(1) and IN(2).

Some other examples are shown below:
Constant function has no input reference.

$$g0=1 \tag{5-0}$$

Examples of mathematical function having only one input reference variable (IN(1)):

$$g1=IN(1) \tag{5-1}$$

$$g2=IN(1)^2 \tag{5-2}$$

$$g3=IN(1)^2 \tag{5-3}$$

$$g4=\cos(IN(1)) \tag{5-4}$$

$$g5=\cos(2·IN(1)) \tag{5-5}$$

$$g6=\sin(IN(1)) \tag{5-6}$$

$$g7=\sin(2·IN(1)) \tag{5-7}$$

$$g8=IN(1)·\cos(IN(1)) \tag{5-8}$$

$$g9=IN(1)·\sin(IN(1)) \tag{5-9}$$

Examples of mathematical function having two input reference variables (IN(1) and IN(2)):

$$g10=IN(1)·IN(2) \tag{5-10}$$

$$g11=IN(1)·\cos(IN(2)) \tag{5-11}$$

$$g12=IN(1)·\sin(IN(2)) \tag{5-12}$$

$$g13=IN(1)^2·IN(2) \tag{5-13}$$

Examples of mathematical function having three input reference variables (IN(1), IN(2) and IN(3)):

$$g14=IN(1)·IN(2)IN(3) \tag{5-14}$$

Examples of mathematical function having four input reference variables (IN(1), IN(2) and IN(3)):

$$g15=(IN(1)-IN(2))/(IN(3)-IN(4)) \tag{5-15}$$

$$g16=(IN(1)\hat{}IN(2))·(IN(3)\hat{}IN(4)) \tag{5-16}$$

In the explanation hereinafter, the functions g0, g1, g2, g3, . . . are used in a meaning as defined here. However these definitions are no more than examples for explanation of concrete examples.

D. Base Function Defining Means 4 and Base Function Defining Procedure P4:

a base function defining means 4 defines a base function f, by specifying a function specifying parameter (m=k), which specifies a mathematical function gk from functions gin in the mathematical function program memory (3), and further specifying a basic variable to be inputted into the r-th temporal input reference variable IN(r) of the specified mathematical function gk. When the specified mathematical functions is a constant function g0, it is not necessary do specify the input reference variable. Even when identical mathematical function is used, when basic variables to be inputted to its input reference variables IN(r) are different, they form different base functions.

The base functions are stored in a base function defining array BF_ARRAY When a set of input data d is comprised of basic variables (x1, x2, x3), base functions corresponding to, for example, a constant function, function x1, function x2, function x1·x2, function x1·x3, function (x1)2, function (x2)2, and differential dx1/dx3 are expressed as follows, using the mathematical function programs g1, g1, . . .

| | BF_ARRAY | |
|---|---|---|
| output | mathematical function program | basic variables to be inputted to temporal input references |
| 1 | g0 | — |
| x1 | g1 | IN(1) = x1 |
| x1$^2$ | g2 | IN(1) = x1 |
| x1 · x2 | g8 | IN(1) = x1<br>In(2) = x2 |
| x1 · x3 | g8 | IN(1) = x1<br>In(2) = x3 |
| dx1/dx3<br>differential | g14 | IN(1) = x1(i + 1)<br>IN(2) = x1(i)<br>IN(3) = x3(i + 1)<br>IN(4) = x3(i) |

The base function defining means 4 can be realized as a file F4 storing a program for defining base functions or a memory storing defined base functions E. Candidate Mathematical Function Specifying Means 5 and Candidate Mathematical Functions Specifying Procedure P5

A candidate mathematical function specifying means 5 specifies a set of base functions selected from the base functions defined by the base function defining means. The temporal candidate mathematical relation shall be specified according to a theoretical ground or an empirical law. The temporal candidate mathematical relations can not be determined uniquely, but shall be determined by a person skilled in the art so that the mathematical relation of the object can be appropriately expressed, using a small number of simple mathematical functions.

For example, following mathematical relations can be supposed for representing a trajectory of the golf club head shown in FIG. 5:

1)

$$p \cdot x^2 + q \cdot y^2 + r \cdot z^2 + a \cdot x + b \cdot y + c \cdot z + d0 + d1 \cdot t + d2 \cdot t^2 = 0 \quad (6)$$

2)

$$a \cdot x + b \cdot y + c \cdot z + d \cdot 1 = 0 \quad (7)$$

The expression #1) represents a model of a movement on an ellipsoid, which has a fixed center and the size is changing according to a quadric function of time t. The expression #2) represents a model of a movement on a plane in an actual space, the distance from the origin to the plane is d, and the direction cosine of the plane is (a, b, c). When it is estimated that both of the mathematical relations stand, the trajectory of the golf club head can be identified as a cross sectional line of a size changing ellipsoid and a static plane.

In the case #1), the candidate mathematical relation can be defined by selecting the following set of base functions (f1, . . . , f9):

| | CF (1) | |
|---|---|---|
| Base function | Mathematical function program | Reference Variable IN(1) |
| f1 = x$^2$ | g2 | x |
| f2 = y$^2$ | g2 | y |
| f3 = z$^2$ | g2 | z |
| f4 = x | g1 | x |
| f5 = y | g1 | y |
| f6 = z | g1 | z |
| f7 = 1 | g0 | — |
| f8 = t | g1 | t |
| f9 = t$^2$ | g2 | t |

In the case #2), the candidate mathematical relation can be defined by selecting the following set of base functions (f1, . . . , f4):

| | CF (2) | |
|---|---|---|
| Base function | Mathematical function program | Reference Variable IN(1) |
| f1 = x | g1 | x |
| f2 = y | g1 | y |
| f3 = z | g1 | z |
| f4 = 1 | g0 | — |

When input data d(i) of the form of a foot shown in FIG. 3 are expressed in terms of a polar coordinate (r, θ), in reference with an origin O, and when the form of the foot is approximated as forms (d), (e), and (f) shown in FIG. 3, namely, the forms d, e and f are represented in a form of r=r(θ), as shown in (g) of FIG. 3, an example of the candidate mathematical relation between r and θ is as follows:

1)

$$r = a + b \cdot \theta + c \cdot \theta^2 + d \cdot \cos\theta + e \cdot \cos 2\theta + f \cdot \sin\theta + g \cdot \sin 2\theta + h \cdot \theta \cos\theta + i \cdot \theta \sin\theta \quad (8)$$

In this case, the candidate mathematical relation can be defined by selecting the following set of base functions (f1, . . . , f10):

| | CF (3) | |
|---|---|---|
| Base function | Mathematical function program | Reference Variable IN(1) |
| f1 = 1 | g0 | — |
| f2 = θ | g1 | θ |
| f3 = θ$^2$ | g2 | θ |
| f4 = cosθ | g4 | θ |
| f5 = cos2θ | g5 | θ |

-continued

| | CF (3) | |
|---|---|---|
| Base function | Mathematical function program | Reference Variable IN(1) |
| f6 = sinθ | g6 | θ |
| f7 = sin2θ | g7 | θ |
| f8 = θcosθ | g8 | θ |
| f9 = θsinθ | g9 | θ |
| f10 = r | g11 | r |

This set of base functions are no more than an example. It is possible to select another set of base functions, for specifying another candidate mathematical relation. In connection with the form of the interior surface of a shoe shown in FIG. 4. It is possible to specify a candidate mathematical relation, by selecting a similar set of base functions.

In connection with a trajectory of a ball thrown by a pitcher shown in FIG. 6, a candidate mathematical relation in an orthonormal coordinate system (x, y, z) can be assumed as follows:

$$x+a0+a1\cdot t+a2\cdot t^2=0 \quad (9\text{-}1)$$

$$y+b0+b1\cdot t+b2\cdot t^2=0 \quad (9\text{-}1)$$

$$z+c0+c1\cdot t+c2\cdot t^2=0 \quad (9\text{-}1)$$

In this case, the candidate mathematical relation between x and t can be defined by selecting the following set of base functions (f1, . . . , f4):

| | CF (4) | |
|---|---|---|
| Base function | Mathematical function program | Reference Variable IN(1) |
| f1 = x | g1 | x |
| f2 = 1 | g0 | — |
| f3 = t | g1 | t |
| f4 = t | g2 | t |

Also in connection with the y, z, similar temporal candidate mathematical relations can be specified.

In connection with FIG. 7, assuming that there is a following empirical relation between the pressure P, temperature T, concentration of a composition A, concentration Y of a component B, and a concentration Z of a product:

$$Z/XY = K0 + K1\cdot P + K2\cdot T + K3\cdot X \quad (10\text{-}1)$$

This expression can be rewritten as follows:

$$K0\cdot XY + K1\cdot XYP + K2\cdot XYT + K3\cdot X^2Y - Z = 0 \quad (10\text{-}2)$$

In this case, a candidate mathematical relation can be defined by selecting the following set of base functions (f1, . . . , f5).

f1=XY, f2=X·T·P, f3=X·Y·T, f4=X²·T, f5=Z

| | CF (5) | | | |
|---|---|---|---|---|
| Base function | Mathematical function program | Reference Variable IN(1) | IN(2) | IN(3) |
| f1 = XY | g10 | X | Y | |
| f2 = XYP | g14 | X | Y | P |
| f3 = XYT | g14 | X | Y | T |
| f4 = X²T | g13 | X | T | |
| f5 = Z | g1 | Z | | |

A candidate mathematical relation specifying means can be realized as a file F5 storing a program for specifying a candidate mathematical relation and/or as a memory storing sets of base functions as candidate mathematical relations. This program can include a program for sequentially specifying different candidate mathematical relations according to a signal from a validity estimating means.

F. Vector Component Acquisition Means 6, Vector Component Acquisition Procedure P6 and Memory 7 for Vector Component Array Value xji of basic variable xj is sent to the input reference variable IN(r) of each of the base functions, so as to be substituted into the mathematical program, then the acquired value Fki of the function is outputted as a vector component.

It is preferable that the vector component acquisition means (6) comprises an array INA for temporary storing the values of basic variables transferred from a data array DATA_ARRAY in the memory (2) for input data, and that the sets of data d(i) are sent form the array DATA_ARRAY for every input data specifying parameter i to this array.

It is further preferable that the values xmi (i=1, 2, 3, . . . ) of the m-th base function are sequentially transferred into the m-th element INA[m] of this array INA. For example, when d is a set of data X, Y, Z, P, T, namely d=(X, Y, Z, P, T), data of X, Y, Z, P, T are stored in the element INA[1], INA[2], INA[3], INA[4], and INA[5] of the array INA. It is preferable that the base function defining means defines the content of the input reference variable of a base function, by defining what variable shall be stored in each of the element INA[m] of this array INA.

For example, the input reference variables of the base functions f1 (=XY), f2 (=XYP), f3 (=XYT), f4(=X²T) and f5(=Z) in CF(5) are variables X, Y, P and T. And the base functions can be defined as follows: CF(G)

| | CF(6) | | | |
|---|---|---|---|---|
| | Mathematical function program | Input reference variables | | |
| | | IN(1) | IN(2) | IN(3) |
| f1 | g10 | INA[1] | INA[2] | |
| f2 | g14 | INA[1] | INA[2] | INA[4] |
| f3 | g14 | INA[1] | INA[2] | INA[5] |
| f4 | g13 | INA[1] | INA[5] | |
| f5 | g1 | INA[3] | | |

When data d(i) are transferred to the input variable array INA for every input data specifying parameter i, basic variables xr are transferred to the corresponding input reference variables IN(r) of each of the base functions through this array INA.

The values xji of the basic variable N are transferred to the input reference variable of each of the base function, indirectly through the array INA or directly without passing through this array. Then the values are substituted into the mathematical function program and the values Fki are acquired. The values Fki are stored into a vector component array VC_ARRAY. By the way, it is not necessary to acquire the values Fki for all of the data set d(i). An embodiment to acquire the values Fki for only a part of the data sets d(i) is possible.

When a set of data is comprised of basic variables X, Y, Z, P and T, namely d=(X, Y, Z, P, T), data d(i), for example, d(5) is transferred to the input reference variabls IN(r) of the base functions f1=XY, f2=XYP, f3=XYT, f4=$X^2$T, and f5=Z of temporal candidate mathematical relation #1) through the array INA[r]is follows:

$INA[1]=X5 \rightarrow IN(1)=X5$ $INA[2]=X5 \rightarrow IN(2)=X5$ $INA[3]=X5 \rightarrow IN(3)=X5$ $INA[4]=X5 \rightarrow IN(4)=X5$ $INA[5]=X5 \rightarrow IN(5)=X5$ Then the values of each of the base functions are acquired:

F15=XY=g10(X5, Y5)=X5·Y5

F25=XYP=g14(X5, Y5, P5)=X5·Y5 P5

F35=XYT=g14(X5, Y5, T5)=X5·Y5·Y5

F45=$X^2$Y=g13(X5, Y5)=$(X5)^2$·Y5

F55=Z=g1(Z)=Z5

Vector components (F1i, F2i, F3i, F4i, F5i) for each data specifying parameter i will be acquired similarly. The vector component acquiring means 6 can be realized as a file F6 storing a vector component acquisition program for carrying out the above mentioned functions.

A set of the function values (F1i, F2i, . . . , Fqi) corresponding to a specific value of the parameter i forms a vector F(i) in a q dimensional space. The vectors F(i) (i=1, 2, . . . ) are stored in a vector component array VC_ARRAY in a memory for a vector component array. The array is a two dimensional array having q columns. An array VC_ARRAY is shown below, where s is the number of data sets:

| VC_ARRAY | | | | |
|---|---|---|---|---|
| F11 | F21 | F32 | ... | Fq1 |
| F12 | F22 | F32 | ... | Fq2 |
| . | . | . | . | . |
| . | . | . | . | . |
| F1qs | F2s | F3s | ... | Fqs |

G. Direction Cosine Acquisition Means 8 and Direction Cosine Acquisition Procedure P8

When the vectors F(i) stored in the vector component array VC ARRAY form a plane in a q dimensional vector space F, or they distribute near to a plane in the space, the direction cosine acquisition means (8) acquire the direction cosine of the plane, using a calculation of cofactors of a determinant or by obtaining an eignevalue of a matrix, for example.

G1. Direction Cosine Acquiring Means Using Cofactors of a Determinant

The base of the mathematical ground this method is explained in Appendix C. This method is suitable in case that the number of the data sets is small.

The direction cosine acquisition means using a cofactor of a determinant in a best mode comprises: a determinant array forming means 8A1, a cofactor calculating means 8A2, a plane degree index calculating means 8A3, plane degree judging means 8A4 and a direction cosine outputting means 8A5.

A determinant array forming means 8A1 selects q vectors arbitrary from the array VC_ARRAY, and forms a determinant of (q×q). When q vectors F(1), . . . , F(q) are selected, the determinant is as follows:

$$\begin{vmatrix} F11 & F21 & F31 & ... & Fq1 \\ F12 & F22 & F32 & ... & Fq2 \\ ... & ... & ... & ... & ... \\ F1q & F2q & F3q & ... & Fqq \end{vmatrix} \quad (11)$$

The cofactor calculating means 8A2 calculates minors As1, As2, . . . , Asq for each row s of this determinant.

The direction cosine outputting means output multiplies $(-1)^{(k+s)}$ to each of the minors Ask, to obtain cofactors Bsk, and output the cofactors as direction cosines Lk. In this specification, the symbol "^" means a power. When the square sum of the L1, L2, . . . , Lq are normalized to be one, a direction cosine in an ordinal meaning can be obtained.

$$(L1)^2+(L2)^2=1 \quad (12)$$

The plane degree index calculating means 8A3 means calculates a plane degree index PI form the minors. The plane degree index is explained in Appendix D.

The plane degree judging means 8A4 judges whether the difference between the plane degree index obtained by the plane degree index calculating means and a predetermined standard value pi is within a allowable region dPI or not. The standard value pi of the plane degree index PI and the allowable region dPI are explained in Appendix D.

When the difference is out of the allowable region, the sets of the data may include sets of data having a large error, thus this sets of data shall be abandoned, and sends a signal to the determinant array forming means to select other sets of data. When the difference is within the allowable region, the plane degree judging means sends a signal to the direction cosine outputting means (8A5) to output the cofactors or to output mean values of each of the cofactors <L1>, . . . , <Lq>.

As explained in Appendix E, the plane degree judging means (8A4) can have a function to judge whether specific cofactors (or minors) are always equal to zero or not. Another candidate mathematical relation shall be set, when some specific cofactors are always equal to zero.

In a best mode, the apparatus according to the present invention calculates a plane degree index and estimate it, as has been explained. However, when it is clear that the errors of data d(i) are small, the calculation is not necessary. The direction cosine can be acquired, by calculating a set of cofactors for an arbitrary row of the determinant, without passing through the procedure of calculating the plane degree index and judging the plane degree. The determinant correspond to vectors F(1), F(2), . . . , F(q). In this case, the normalization is not inevitable.

The method for calculation of the determinant, minors, and cofactors using a computer are well known, thus the explanations about them are omitted.

G2. Direction Cosine Acquiring Means Using Eignevalue of a Matrix

This means and method are suitable, when a lot of data sets d(i) can be acquired. The ground of this method is explained in Appendix F. As explained there, an eigenvalue corresponds to the square sum the perpendicular lines from each of the vectors F(i) to a mapping plane. It is explained in Appendix G that all the eigenvalues are real number and non-negative. By obtaining a positive eigenvalue smaller than a value $\lambda 0$, which is a predetermined value of the square sum of the length of the perpendicular line, and obtaining the eigenvector corresponding to the eigenvalue, the mapping plane can be determined.

In the best mode of the direction cosine acquisition means 8 using an eigenvalue comprises: a correlation sum calculating means 8B1, a eigenvalue calculating means 8B2 and a eigenvector calculating means 8B2.

The correlation sum calculating means 8B1 calculates a sum of the product of a-th (a=1, . . . , q) element Fai and b-th (b=1, . . . , q) element Fbi in the vector component array VE_ARRAY (Appendix (F3), (F17)). The obtained correlation sums form a correlation matrix C and are stored in a correlation sum array CO_ARRAY. Namely, the element <a|b> of the correlation sum is stored at a-th row, b-th column in the array CO_ARRAY. An example of the correlation sun array is shown below.

Correlation sum matrix C $$\begin{pmatrix} \langle 1|1 \rangle & \langle 1|2 \rangle & \ldots & \langle 1|q \rangle \\ \ldots & \ldots & \ldots & \ldots \\ \langle q|1 \rangle & \langle q|2 \rangle & \ldots & \langle q|q \rangle \end{pmatrix} \quad (13)$$

A secular equation corresponding to the correlation sum C is formed. And the eigenvalue calculating means 8B2 solves the secular equation, to obtain positive eigenvalues $\lambda 1$, $\lambda 2$, . . . of the secular equation, which are close to zero, namely smaller than a predetermined value $\lambda 0$.

It is possible to obtain all the eigenvalues, and to select eigenvalues smaller than a predetermined value $\lambda 0$ In this case, all the eigenvalues must be obtained by an all eigenvalue caluculation means ALL, and smaller eigenvalues are selected using a comparator COMP. However, when the secular equation is developed into a polynomial of $(-\lambda)$ using a polynomial forming means POLYNOM, the eigenvalues can be obtained easily in short time. In the development of the equation, t-th traces of the secular equation, which can be obtained using a trace calculation means, can be used. The zero points of the polynomial in a region $[0, \lambda 0]$ are calculated. This method is explained in Appendix H.

In the next step, the eigenvector calculating means 8B3 calculates an eigenvector corresponding to eigenvalues $\mu$m. The method to obtain an eigenvector from an eigenvalue is known, thus the explanation is omitted.

By the way, the number of eigenvalues close to zero (eigenvalues smaller than a predetermined value $\lambda 0$) is not always one. For example, assuming that points P(i) in a q dimensional space correspond to data d(i). When the points P(i) distribute along a line, which is a cross sectional line of two (q−1) dimensional planes in the q dimensional space, one can understand that the data d(i) are mapped to two mapping planes. For example, assuming that a trajectory of a golf club head is a cross sectional line of an ellipsoid and a plane, when base functions corresponding to the expression (6) is selected as a candidate mathematical relation, two sets of eigenvectors, one of them corresponds to an equation of an ellipsoid and the other corresponds to an equation of a plane, can be obtained.

The direction cosine acquisition means can be realized as a file F8 storing a ( ) direction cosine acquisition program, which acquires a direction cosine according to G1 or G2.

H Validity Estimating Means 9 and Validity Estimating Procedure P9

A validity estimating means 9 estimates the validity of the obtained mathematical relation on the basis of the eigenvalue, which corresponds to the obtained direction cosine acquired in the direction cosine acquisition means P9.

For example, zero points in region $[0, \lambda 0]$ can be obtained after developing the secular equation into a polynomial. However, the allowance of the measurement error shall be determined independently, on the basis of industrial or commercial grounds. When a smaller allowance of the measurement error is permissible, the allowance of eignevalue $\lambda$ref shall be set smaller than the allowance value $\lambda 0$, so as to abandon the eigenvalues larger than the value $\lambda$ref. When the candidate mathematical relation is not be appropriate, or the sets of data may include data set including large error data, the eigenvalue will become larger than the value $\lambda$ref. In such a case, the process returns to the procedure P6 to select another sets of data d(i), or returns to the procedure P5 to select another candidate mathematical relation.

Namely, when the eignevalue is not smaller than the predetermined value, the candidate mathematical relation will be abandoned, and the process returns to the candidate mathematical relation specifying procedure P5, as shown in FIGS. 1 and 2. The candidate mathematical relation specifying means 5 selects another mathematical relation, the vector component acquisition means 6 calculates the vector components, and the direction cosine acquisition means 8 acquires again a direction cosine. These procedures are repeated, until an appropriate eigenvalue is obtained.

When no candidate mathematical relation can be predicted, different temporal candidate mathematical relations are set sequentially and/or different sets of data d(i) are set sequentially, and the mathematical relation identification procedure is repeated, so as to acquire an eigenvalue as small as possible.

When a certain candidate mathematical relation can be predicted, for example, it is certain that the form is a paraboloid and only the identification of the values of the parameters is required, the base functions shall be fixed, so that the mathematical relation can be identified only by obtaining the direction cosine. It is no need to return to the candidate mathematical relation specifying procedure P5.

By the way, the validity estimating means is not inevitable to carry out the present invention. For example, when allowed time for data processing is short, and it is known that the error in the input data is small, the validity estimating means can be omitted.

The validity estimating means 9 can be realized as a file F9 storing a validity estimating program for estimating the validity.

I. Mathematical Relation Outputting Means 10 and Mathematical Relation Outputting Procedure P10

When the direction cosine of the mapping plane for each of the base function is Lk (k=1, 2, . . . , q), and the validity estimating means 9 estimates that the eigenvalue is valid, mathematical relation outputting means 10 outputs an expression corresponding to the following mathematical relation as the acquired mathematical relation:

$$\sum_{k=1}^{q} (Lk \cdot fk) = 0 \quad (14)$$

For example, when the obtained direction cosine of the temporal candidate mathematical relation of the example of CF(5) is (L1, L2, L3, L4, L5), the following mathematical expression or an expression or value deduced from the expression is outputted:

$$L1\cdot f1+L2\cdot f2+L3\cdot f3+L4\cdot f4+L5\cdot f5=0 \quad (15)$$

Namely, the following expression will be outputted:

$$L1\cdot XY+L2\cdot XYP+L3\cdot XYT+L4\cdot X^2Y+L5\cdot Z=0 \quad (16)$$

Because f1=XY, f2=XYP, f3=XYT, f4=$X^2$Y, and f5=Z, according to CF(5).

The mathematical relation can be sent to a controlling apparatus, display, or printer, etc, which are connected to the apparatus of the present invention. The controlling apparatus will carry out a necessary calculation on the basis of the mathematical relation and sends a controlling signal to another apparatus.

The mathematical relation outputting means can be realized as a file F10 storing a mathematical relation outputting program for outputting a mathematical relation.

As explained, an apparatus for identifying a mathematical relation in best mode can be realized using: a file F1 storing a data acquisition program, a file F2 storing a data array forming program when it is necessary, a file F3 storing prepared mathematical function programs and/or a mathematical program forming program, a memory storing base functions and/or a file F4 storing a base function defining program, a file F5 storing a program for specifying a candidate mathematical relation and/or specifying a memory storing sets of base functions as candidate mathematical relation, a file F6 storing a vector component acquisition program, a file F8 storing a direction cosine acquisition program, a file F9 storing a validity estimating program, a file F10 storing a mathematical relation outputting program, and a file F11 storing a control program for controlling these programs to function as described in this specification.

INDUSTRIAL APPLICABILITY

A. The present invention can be applied as an apparatus for measuring a form of an object: For example, a form of a foot or a form of an interior of a shoe can be identified using the apparatus according to claim 1, then the form of such an object can be specified using a set of direction cosine or a set of values deduced from the direction cosine. Namely, selecting an appropriate set of base functions, a form can be expressed as a linear combination of the base functions. The form can be represented by the combination coefficient. A data base of a form can be constructed, using this coefficient as a parameter.

B. The present invention can be used as an apparatus for identifying a trajectory of a moving object. The mathematical relation of a trajectory of a golf club head, or a ball thrown by a pitcher, etc., can be identified, so that the trajectory can be analyzed or the trajectory in the future can be predicted An application to an identification of a trajectory of a golf club head and its analysis are explained, in Appendix I.

C. The present invention can be applicable as an analyzer of measured data. A mathematical relation can be identified with relatively small number of experiments, even when a set of data is comprised of a lot of parameters, for example, a data of a chemical process.

There is a case that a differential equation can be identified from data, when the data shall be described by a differential equation. An example is shown in Appendix J.

APPENDIX

A <Relation Between Combination Coefficients and Direction Cosine>

In the present invention, a mathematical relation is expressed as a linear combination of base functions fk k=1, 2, . . . , q).

The principle of the present invention is that a linear combination of base functions is supposed as a candidate mathematical relation, and input data are transformed to sets of data in a q dimensional space spanned by the base functions, each set of data forms a vector in the space, when the vectors are found in a plane in the q dimensional space, the supposed mathematical relation is understood to be correct.. The essential idea of the present invention is to propose an apparatus and method for finding the direction cosine of the plane and for outputting the mathematical relation.

For example, when sets of input data with two variables d(i)=(x(i), y(i)) (i=1 . . . ) are given, and the following mathematical relation is supposed to stand:

$$a\cdot x^2+b\cdot x+c\cdot y+d\cdot 1=0 \quad (A1)$$

The sets of data (x, y) shall form a parabola curve. Although, when the data (x, y) are transformed by a set of functions, x1=$x^2$, x2=x, x3=y, x4=w where (w=1), the following relation will be obtained:

$$a\cdot x1+b\cdot x2+c\cdot x3+d\cdot x4=0 \quad (A2)$$

$$x4=1 \quad (A3)$$

We introduce a 4 dimensional vector P(x1, x2, x3, x4) having vector components (x1, x2, x3, x4). A point P(i) corresponding to a set of data d(i) can be found at a cross sectional line of two planes, a first plane 1 satisfies the relation (A1), and a second plane 2 satisfies the relation (A3)

The proportion of the direction cosine of the plane 1 are (a:b:c:d) Therefore, if one can determine the direction cosine of the plane 1 from the sets of input data d(i), and when the relation (A3) is combined, one can identify the mathematical expression to be a parabola curve.

The present invention generalizes this idea. Namely at first, a set of base functions, inputs variables of which are measured values, are defined. A candidate mathematical relation is predetermined by selecting a set of the base functions. The measured valued are inputted into each base function to obtain the value of the base function. The set of the values of the base functions forms a vector space, namely the measured data are mapped into a vector space. When the mapping is a plane in the vector space, the direction cosine of the plane is calculated. Finally, the mathematical relation is identified as a linear combination of the base function. The combination coefficients of the linear combination are proportional to the direction cosine.

When the mapping form a plane or substantially a plane in the vector space, in this description of the invention, we call it "a mapping plane". The term "mapping plane" is used also as a plane which gives the value zero or the minimum value of the sum of squares of distances between the plane and the mapped points of the data.

When the mapped points do not form a mapping plane or cannot be approximated as a mapping plane, the data or the candidate mathematical relation is judged to be improper. Another set of data or another candidate mathematical relation will be selected, until a mapping plane can be found so as to obtain a proper mathematical relation between the data.

B. <A Pane in a Vector Space at Higher Dimension>

In this specification, a "plane" is a set of points in a q dimensional vector space (x1, x2, ..., xq), the points in the set satisfy the following relation:

$$L1 \cdot x1 + \ldots + Lq \cdot xq = 0 \quad (B1)$$

where the L1, L2, ... Lq are constant coefficients.

Also a set of points on an intersecting line of a plurality of planes in a q dimensional vector space is called a "space". For example, a set of points on the crossing of two planes in a three dimensional space is a line, however, in this specification, it is called a "space".

For example, when coordinates of an object (x, y) is represented by the following expression, which are functions of time t:

$$x(t) = c1 \cdot t^2 + d1 \cdot t + e1 \quad (B2)$$

$$y(t) = c2 \cdot t^2 + d2 \cdot t + e2 \quad (B3)$$

When base functions xi to x5 defined as x1=x, x2=y, x3=$t^2 \cdot$x4=t, x5=w. (w=1), are introduced, these relations can be expressed by a set of three planes in a vector space (x1, x2, x3, x4, x5):

$$a \cdot x1 + c1 \cdot x3 + d1 \cdot x4 + e1 x5 = 0$$

$$a \cdot x2 + c2 \cdot x3 + d2 \cdot x4 + e2 x532\ 0$$

$$x532\ w = 1$$

On the other hand, a form of a surface can be expressed using a single mathematical expression. A form of a surface is not limited to a form of an object, for example, an outer surface of a foot, or an inner surface of a shoe, but also includes a surface in an abstract space, which expresses a mathematical relation between a plurality of parameters, for example, a relation between temperature T, pressure P, volume V and concentration C.

C. <Relation Between a Cofactor and a Direction Cosine>

When q vectors F(s)=(F1s, F2s, ..., Fqs) (s=1, 2, ..., q) in a q dimensional space and the origin (0, ..., 0) are included in a plane of a q dimensional space, the following determinant V is equal to zero:

$$V = \begin{vmatrix} F11 & F21 & \ldots & Fq1 \\ F12 & F22 & \ldots & Fq2 \\ \ldots & \ldots & \ldots & \ldots \\ F1q & F2q & \ldots & Fqq \end{vmatrix} \quad (C1)$$

For example, when base functions are f1, f2, f3, and the value of the base functions f1, f2, f3 corresponding to the detected values d(1), d(2), d(3) are (F11, F21, F31), (F12, F22, F32), (F13, F23, F33), the points P1, P2,P3 2,) corresponding to these vectors and the origin (0,0,0) form a parallelogram. However, when the parallelogram is contained in a plane, the following determinant V is equal to zero.

$$V = \begin{vmatrix} F11 & F21 & F31 \\ F12 & F22 & F32 \\ F13 & F23 & F33 \end{vmatrix} = 0$$

It is known that the equation corresponding to the plane of the mathematical expression Cl can be expressed by a determinant, in which one vector in the vectors F(1), F(2), ... F(q) are replaced to coordinate variables (x1, ... xq). For example, by replacing the q-th vector F(q) to (x1, x2, ..., xq), an (equation of the plane can be obtained, as follows:

$$0 = \begin{vmatrix} F11 & F21 & \ldots & Fq1 \\ F12 & F22 & \ldots & Fq2 \\ \ldots & \ldots & \ldots & \ldots \\ F1z & F2z & \ldots & Fqz \\ x1 & x2 & \ldots & xq \end{vmatrix} \quad (C2)$$

where (q−1) is replaced to z, namely (z=q−1), for facilitating the understanding of the determinant.

When this determinant is expanded in respect to the q-th row, the following linear combination will be obtained (Aqk is a minor, and s(q, k) is a sign), $$0 = s(q,1) \cdot Aq1 \cdot x1 + s(q,2) \cdot Aq2 \cdot x2 + \ldots + s(q,q) \cdot Aqq \cdot xq \quad (C3)$$

$$s(q,k) = (-1)^{(q+k)} \quad (C4)$$

This expansion can be rewritten as follows:

$$0 = Bq1 \cdot x1 + Bq2 \cdot x2 + \ldots + Bqq \cdot xq \quad (C5)$$

where Bqk is a cofactor (s(q, k)·Aqk).

On the other hand, direction cosine L1, ..., Lq of a plane satisfies the following relation:

$$0 = L1 \cdot x1 + \ldots + Lq \cdot xq \quad (C6)$$

Consequently the following proportional relation stands:

$$L1 : L2 : \ldots : Lq = Bq1 : Bq2 : \ldots : Bqq \quad (C7)$$

Therefore, the direction cosines is proportional to cofactors.

When the determinant V=0, the mapping is a plane, and the obtained proportion coefficients of the direction cosines is constant, irrespective to the row Fj) (j=1, ..., q), which is replaced in calculation of minors.

When V≈0, it is judged whether the vectors are found nearly in a plane or not, on the basis of an index PI. The index PI indicates in what degree the vectors F(1), ..., F(q) can be regarded as a plane. It is judged whether the index is within a predetermined region dPI or not. In case that V=0 and that the index PI is found in a predetermined region dPI, it can be judged that the mapping is nearly a plane, namely, a mapping plane.

The index PI and the predetermined region will be explained in Appendix D

D. <Plane degree index PI and allowance dPI>

A vector F(k) in a q dimensional vector space can be expressed as (F1k, F2k, ..., fqk). When the origin (0, 0, ..., 0) of the vector space and q vectors F(1), ..., F(q) are in a common plane, the determinant |F| corresponding to the vectors F(1), ..., F(q) is zero:

$$|F| = \begin{vmatrix} F11 & F21 & \ldots & Fq1 \\ \ldots & \ldots & \ldots & \ldots \\ F1q & F2q & \ldots & Fqq \end{vmatrix} = 0 \quad (D1)$$

When a vector F(m) in the vectors is exchanged by a set of variables (x1, ..., xq), the plane can be expressed, as explained before, by the following expression:

$$L1(m) \cdot x1 + \ldots + Lq(m) \cdot xq = 0 \quad (D2)$$

where L1(m), L2(m), ..., Lq(m) are cofactors of each variable (x1, ..., xq).

By multiplying a normalizing factor $N=((L1)^2+ \ldots + (Lq)^2)^{-1/2}$ to this expression and further by multiplying a sign normalizing factor S so that the coefficient of one of the variable, for example, x1, to be positive, the following expression is obtained. This expression is invariant irrespective to the selection of m.

$$N \cdot S \cdot L1(m) \cdot x1 + \ldots + N \cdot S \cdot Lq(m) \cdot xq = 0 \quad (D3)$$

Namely, when the vectors F(1), . . . , F(q) are in a common plane, the following relations stand:

$$N \cdot S \cdot L1(1) = \ldots = N \cdot S \cdot L1(q)$$

$$N \cdot S \cdot L2(1) = \ldots = N \cdot S \cdot L2(q) \ldots$$

. . .

$$N \cdot S \cdot Lq(1) = \ldots = N \cdot S \cdot Lq(q)$$

However, when the vectors F(), . . . F(2) are not exactly in a common plane, but are positioned nearly in a common plane, the following relations stand $$N \cdot S \cdot L1(1) \approx \ldots N \cdot S \cdot L1(q)$$

$$N \cdot S \cdot L2(1) \approx N \cdot S \cdot L2(q)$$

$$N \cdot S \cdot Lq(1) \approx \ldots \approx N \cdot S \cdot Lq(q)$$

The plane degree index PI is an index indicating in what degree the vectors F(1), . . . , F(q) can be regard as a plane The plane degree PI shall be defined so that the plane degree index is a function of the direction cosine Lj(p), and the value of the index PI approaches to a specified standard value PI(0), (for example, PI(0) can be identical to zero), when the proportions of the direction cosine distribute closer to each other. Namely the fact that PI is equal to the standard PI(0) means that the vectors form a common plane, and the fact that PI is nearly equal to the standard PI(0) means that they form nearly a common plane.

For example, assuming the mean value of the N·S·Lk(m) to be <Lk>, deviation of the N·S·Lk(m) from the mean value to be dLk(m), and the means square value of the deviation to be msv, it is preferable to define the plane degree index by the means square value msv.

Further, assuming the maximum of the absolute value of N·S·Lk(m)–<Lk> to be M(m), and the maximum of the M(m) to be M, the plane degree index PI can be defined as PI=M.

PI, PI(0) can be arbitrary defined on the basis of any industrial or commercial grounds.

When the absolute value of the difference |PI-PI(0)| between a plane degree index PI obtained from q vectors F(1), . . . , F(q) and the standard value PI(O) is smaller than a predetermined allowance dPI, it can be defined that the vectors are nearly in a common plane, and the plane is the sought mapping plane It is possible to output the mean value of the direction cosine <L1>, . . . , <Lq> as a direction cosine of the vectors F(1), . . . , F(q). Also the allowance dPI can be defined on the basis of any industrial or commercial grounds.

When it is assured that the measuring error of the data d(i) are small, it is not always necessary to obtain the plane index PI.

E. <Cases That Cofactors are Zero>

Assuming that the measured data d(i)=(xi, yi, ti) are coordinates of a moving body, and (xi, yi) are values of the position coordinate (x, y), and ti are values of the time coordinate t. Further assuming that the following relations stands:

$$x + 2 \cdot t3 \cdot 1 = 0 \quad (E1)$$

$$y + 4 \cdot t^2 + 5 \cdot t + 6 \cdot 1 = 0 \quad (E2)$$

When a set of base functions are defined as x1=1, x2=t, x3=$t^2$, x4=x, x5=y, for this data d(i), and forming a mapping of these data set d(1), d(2), d(3), d(4), d(5) into the five dimension vector space [x1, x2, x3, x4, x5], the following five vectors can be obtained:

$$P(1) = (1, t1, (t1)^2, X1, y1)$$

$$P(2) = (1, t2, (t2)^2, x2, y2)$$

$$P(3) = (1, t3, (t3)^2, x3, y3)$$

$$P(4) = (1, t4, (t4)^2, x4, y4)$$

$$P(5) = (1, t5, (t5)^2, x5, y5)$$

The cofactors A14, A24, A34, A44, A54, regarding the fourth column and the cofactors A15. A25, A35, A45, A55, regarding the fifth column of the determinant of the vectors P(1), P(2), P(3), P(4), P(5) are always equal to zero, because of the relations (E1) and (E2).

The fact that cofactors regarding a specific column are always equal to zero indicates that the selected candidate mathematical relation is not appropriate, and some unnecessary base functions are included in the mathematical relation.

As to this example, either of the base functions [y] or [x] is unnecessary For example, when a candidate mathematical relation is selected so that the data set d(i) can be mapped into a four dimension vector space [1,t,$t^2$, x], a relation between the time t and the x co-ordinate can be obtained from the direction cosine And when a candidate mathematical relation is selected so that the data set d(i) can be mapped into a four dimension vector space [1,t,$t^2$,y], a relation between the time t and the y co-ordinate can be obtained from the direction cosine.

F. <Mathematical Basis of the Method for Obtaining the Direction Cosine, Using an Eigenvalue>

Even if the mapping of a set of measured data d(i) through base functions (f1, f2, . . . , f3) could form a plane, when measured data contain errors, and the values of base functions also contain errors, thus the mapped points corresponding to the measured values distribute at a region near to a plane. In this method, the direction cosine of a plane, the sum of the squares of the distance between those points and the plane (i.e., the square of the length of the perpendicular lines) is the minimum, is calculated.

The direction cosine (L1, . . . , Lq) of a plane in a q dimensional space is perpendicular to this plane, and its absolute value is one. Thus the length h(i) of the perpendicular line from each point Pi (F1i, F2i, . . . , Fqi) to this plane is given by the inner product <(L, . . . , L1) (F1i, F2i, . . . , Fqi)> of the direction cosine and the vector Pi.

$$h(i) = L1 \cdot F1i + \ldots + Lq \cdot Fqi \quad (F1)$$

The sum H of the squares of the lengths h of the perpendicular lines is given by the following expression, using a correlation sum <a |b>:

$$H = \sum h(i)^2 \quad (F2)$$

$$= \sum (L1 \cdot F1i + \ldots + Lq \cdot Fqi)^2$$

-continued $$= \sum_{a=1}^{q}\left(\sum_{b=1}^{q}\left(La \cdot Lb \cdot \sum_{i}(Fai \cdot fbi)\right)\right)$$

(In this specification, $X_i$ is a sum regarding running variable i.)

Here, a correlation sum is defined as follows:

Correlation sum$<a|b>$=$\Sigma(Fai \cdot Fbi)$ (F3)

Following expression can be obtained:

$$\sum_{i} h(i)^2 = \sum_{a=1}^{q}\left(\sum_{b=1}^{q}(La \cdot Lb \cdot <a|b>)\right)$$ (F4)

Because L1(1, 2, ... , q) is a direction cosine, the following relation stands:

$(L1)^2 + \ldots + (Lq)^2$ (F5)

Now, the problem is to find the values of L1, L2, ... , Lq, which give the minimum of the square sum of $h^2$, under the condition (F5). This problem can be solved using the Lagrange method of undetermined multipliers. In the Lagrange method, for example, the maximum or minimum of a two variable function f(x, y) under a condition (g(x, y)=0 ) can be found, by making a estimation function (F(x, y)=f(x, y)–$\lambda$·g(x, y) ), and calculating the value of $\lambda$, x, and y, from the conditions ($\partial F/\partial x=0$, $\partial F/\partial y=0$, g(x, y)=0).

The Lagrange method is applied to the present problem, where the variables are L1, ... , Lq. The estimation function F(L1, ... , Lq) is defined as follows:

$F(L1, \ldots Lq) = h^2 - \lambda \cdot ((L1)^2 + \ldots + (Lq)^2 - 1)$ (F6)

Because the derivative of the estimation function with respect to the variables L1, ... , Lq are equal to zero, the following eigenvalue equation can be obtained:

$$\begin{pmatrix} \langle 1|1\rangle & \langle 1|2\rangle & \ldots & \langle 1|q\rangle \\ \langle 2|1\rangle & \langle 2|2\rangle & \ldots & \langle 2|q\rangle \\ \ldots & \ldots & \ldots & \ldots \\ \langle q|1\rangle & \langle q|2\rangle & \ldots & \langle q|q\rangle \end{pmatrix} \begin{pmatrix} L1 \\ L2 \\ \ldots \\ Lq \end{pmatrix} = \lambda \begin{pmatrix} L1 \\ L2 \\ \ldots \\ Lq \end{pmatrix}$$ (F7)

The matrix comprised of correlation sum $<i|j>$ at the left side is called correlation sum matrix C, in this Specification. The eigenvalue equation is equivalent to the following secular equation:

$$\begin{vmatrix} \langle 1|1\rangle - \lambda & \langle 1|2\rangle & \ldots & \langle 1|q\rangle \\ \langle 2|1\rangle & \langle 2|2\rangle - \lambda & \ldots & \langle 2|q\rangle \\ \ldots & \ldots & \ldots & \ldots \\ \langle q|1\rangle & \langle q|2\rangle & \ldots & \langle q|q\rangle - \lambda \end{vmatrix} = 0$$ (F8)

When this secular equation can be solved, and assuming that an eigenvalue is $\lambda m$, and an eigenvector corresponding to the eigenvector is (L1m, L2m, ... , Lqm), the following relation stands:

$$H = \sum h(i)^2$$ (F9)

-continued $$= \sum (L1 \cdot Fi + \ldots + Lq \cdot Fqi)^2$$

$$= \sum_{a=1}^{q}\left(\sum_{b=1}^{q}\left(La \cdot Lb \cdot \sum_{j}(Fai \cdot Fbi)\right)\right)$$

$$= \sum_{a=1}^{q} La \cdot \left(\sum_{b=1}^{q} Lb \cdot <a|h>\right) = \sum_{a=1}^{q} La \cdot \lambda m \cdot La$$

$$= \lambda m((L1)^2 + \ldots + (Lq)^2) = \lambda m$$

This means that when the square sum of the length of the perpendicular lines is minimum, the square sum H of the length of the perpendicular lines is $\lambda$m, when it is zero, the vector points P(i) are on a plane, and when it is nearly equal to zero, the vector points are distributed in a region near to a plane. When the eigen value km is nearly equal to zero, the mathematical relation between the measured data (i) can be identified as follows:

$L1 \cdot f1 + L2 \cdot f2 + \ldots + Lq \cdot fq = 0$ (F10)

The validity can be estimated whether the eigen value $\lambda$m is smaller than a predetermined value $\lambda_0$.

A plurality of the eigenvalues can be simultaneously valid. For example, mappings of the measured data distribute on a cross-sectional line of two planes, the equations of the two planes corresponding to two eigenvalue can be identified as the mathematical relations.

For example, consider a case that the input data d(i) are co-ordinates of a trajectory (t, x, y), and the data d(i) of the trajectory (t, x, y) are mapped into a five dimensional vector space[x1, x2, x3, x4, x5], namely, [t→x], $t^2$→x2, 1→x3, x→x4, y→x5]. Assuming that the following two mathematical relations are obtained from the eigenvalues and the eigenvectors:

$2 \cdot x1 + 0 \cdot x2 + 5 \cdot x3 + 1 \cdot x4 + 0 \cdot x5 = 0$ (F11)

$0 \cdot x1 + 3 \cdot x2 + 4 \cdot x3 + 0 \cdot x4 + 1 \cdot x5 = 0$ (F12)

Direction cosines can be obtained by multiplying a normalizing factor $N_1$, $N_2$, respectively to each set of the coefficients (2,0,5,1,0), and (0,3,4,0,1).

$N_1 = (2 \cdot 2 + 5 \cdot 5 + 1 \cdot 1)^{-\frac{1}{2}}$ $N_2 = (3 \cdot 3 + 4 \cdot 4 + 1 \cdot 1)^{-\frac{1}{2}}$ In this case, the following two mathematical relations can be identified and they are simultaneously valid.

$2t + 5 + x = 0$ (F13)

$3t^2 + 4 + y = 0$ (F14)

Sometimes, weighting of measured data is necessary. There is a case that a mathematical relation is identified from a time sequential data d(i), imposing a light weighting to old data and a heavy weighting to new data. For example, when a temperature shall be controlled to follow a predetermined curve by controlling the heat supply, there is a case that it is not preferable to treat old and recent data with an identical weighting.

As explained before, the length h(i) of the perpendicular line from each point Pi(F1i, F2i, ... , Fqi) to a plane can be expressed by an inner product of the direction cosine and the vector Pi:

$h(i) = L1 \cdot F1i + \ldots + Lq \cdot Fqi$ (F1)

Multiplying a weight Wi to the value h, following expression can be obtained:

$$Wi \cdot h(i) = Wi(L1 \cdot F1i + \ldots + Lq \cdot Fqi) \tag{F15}$$

The square sum H of the lengths h(i) of the perpendicular lines with the weighting is given by the following expression:

$$H = \sum Wi^2 \cdot h(i)^2 \tag{F16}$$

$$= \sum Wi^2 \cdot (L1 \cdot F1i + \ldots + Lq \cdot Fqi)^2$$

$$= \sum_{a=1}^{q} \left( \sum_{b=1}^{q} \left( La \cdot Lb \cdot \sum_{i} Wi^2 \cdot (Fai \cdot Fbi) \right) \right)$$

Here, the definition of the correlation sum is expanded as follows:

$$\text{Correlation sum} <a|b> = \Sigma Wi^2 \cdot (Fai \cdot Fbi) \tag{F17}$$

(The definition by (F3) corresponds to a case that all the Wi art equal to one.)
The following relation stands:

$$H = \sum Wi^2 \cdot h(i)^2 \tag{F18}$$

$$= \sum_{a=1}^{q} \left( \sum_{b=1}^{q} (La \cdot Lb \cdot <a|b>) \right)$$

The correlation sum defined by (F17) is a real symmetrical matrix. And the expression (F18) has same form as the expression (F4), therefore, all of the arguments explained on the ground of the definition of the correlation sum according to (F2) are valid for this definition.

G. <The Eigenvalues of the Correlation Sum Matrix are Positive Real Numbers>

1) The correlation sum matrix C is a real symmetric matrix. Therefore the matrix is an Hermitian matrix, and all of its eigenvalue are real number.

2) It is known that the necessary and sufficient condition for that all of the eigenvalues of an Hermitian matrix T are positive is that for any non-zero vector x, the scalar product $<xT \cdot x^T>$ is non-negative.

According to the definition of a correlation sum matrix (F3):

$$<a|b> = \Sigma(Fai \cdot Fbi) \tag{F3}$$

The scalar product is obtained, when a vector $(x1, x2, \ldots, xq)$ and its transposed matrix $(x1, x2, \ldots, xq)^T$ are multiplied to a correlation sum matrix C, respectively from the left side and the right side. Using the expression (F9), the scalar product $<xC \cdot x^T>$ can be transformed as follows:

$$<xC \cdot x^T> = \sum \sum xa \cdot xb \cdot <a|b>$$

$$= \sum_{a=1}^{q} \left( \sum_{b=1}^{q} \left( xa \cdot xb \cdot \sum_{i} (Fai \cdot Fbi) \right) \right)$$

$$= \sum_{i} (x1 \cdot F1i + \ldots + xq \cdot Fqi)^2 \geq 0$$

As shown here, $<xC \cdot x^T>$ is non-negative. Also when the correlation sum matrix is defined by (F17), it can be proved that the all the eigenvalues are non-negative real numbers, in the same manner.

H. <A Method for Obtaining the Eigenvalues between a Predetermined Value $\lambda_0$ and the zero>

Because all the eigenvalues of a correlation sum matrix are non-negative, all the eigenvalue smaller than the predetermined value $\lambda_0$ are between the zero and the value $\lambda_0$. An eigenvalue in this region can be found as follows, for example.

Assuming that a matrix K having q rows and q columns is given, as follows;

$$K = \begin{pmatrix} K11 & K12 & \ldots & K1q \\ K12 & K22 & \ldots & K2q \\ \ldots & \ldots & \ldots & \ldots \\ Kq1 & Kq2 & \ldots & Kqq \end{pmatrix} \tag{H1}$$

Selecting n diagonal elements Kii(i=n1, n2, ..., nn) from this matrix, a determinant K(n1, n2, ..., nu) can be formed, which is composed of the n1-th, n-th, ..., nn-th columns and rows of the matrix K. As an example, matrix K(1,3) is shown below:

$$K(1, 3) = \begin{vmatrix} K11 & K13 \\ K31 & K33 \end{vmatrix} \tag{H2}$$

A trace(n) is defined as a sum of al the determinant K(n1, n2, ..., nn), which include n diagonal elements of the matrix K. Here, trace(0) is defined to be 1.

$$\text{trace}(0) = 1 \tag{H3a}$$

$$\text{trace}(1) = K11 + K22 + + Kqq \tag{H3b}$$

$$\text{trace}(2) = \sum_{i \neq j} \begin{vmatrix} Kii & Kij \\ Kji & Kjj \end{vmatrix} \tag{H3c}$$

$$\text{trace}(3) = \sum_{\substack{i \neq j \\ j \neq k \\ k \neq i}} \begin{vmatrix} Kii & Kij & Kik \\ Kji & Kjj & Kjk \\ Kki & Kkj & Kkk \end{vmatrix} \tag{H3d}$$

$$\text{trace}(q) = \begin{vmatrix} K11 & K12 & \ldots & Kiq \\ K21 & K22 & \ldots & K2q \\ \ldots & \ldots & \ldots & \ldots \\ Kq1 & Kq2 & \ldots & Kqq \end{vmatrix} \tag{H3e}$$

The secular equation corresponding to the matrix K can be expanded as a polynomial of the powers of $(-\lambda)$, as follows:

$$0 = \begin{vmatrix} K11 - \lambda & K12 & \ldots & K1q \\ K21 & K22 - \lambda & \ldots & K2q \\ \ldots & \ldots & \ldots & \ldots \\ Kq1 & Kq2 & \ldots & Kqq - \lambda \end{vmatrix} \tag{H4}$$

$$= \sum_{n=0}^{q} (\text{trace}(q-n)) \cdot ((-\lambda)^n)$$

$$n = 0$$

This is a polynomial of $(-\lambda)$. Therefore, it is easy to find a zero point in a region between zero and X using a conventional method, for example, by dividing the region into small sections.

I. <An Application of the Identification of the Mathematical Relation to an Analysis of a Trajectory of a Golf Head>

Quantitative diagnosis of golf swing is possible. For example, finding the direction cosines of planes, in which the golf club head moves in the initial period, middle period and the final period of the golf swing, one can diagnose whether the swing trajectory is in a plane or not, according to the change of the direction cosines in the swing, and diagnose how the club head is accelerated.

For example, assuming that a trajectory of the golf club head is an intersectional curve of a fixed plane and an ellipsoid, which has a fixed center and its size changes with time t according to a second order function of time t, the trajectory can be expressed as follows:

1)

$$p \cdot x^2 + q \cdot y^2 + r \cdot z^2 + a \cdot x + b \cdot y + c \cdot z + d0 + d1 \cdot t + d2 t^2 = 0 \quad (I1)$$

2)

$$a \cdot x + b \cdot y + c \cdot z + d1 = 0 \quad (I2)$$

It is possible to determine the values of the parameters p, q, r, a, b, c, d0, d1, d2, d0 of the expressions (I1) and (I2), by selecting an appropriate base functions, a candidate mathematical relation and by mapping into a vector space F, as explained in connection with the expressions (6) and (7)

A method to find the change of the angular position, namely, the angular velocity and the angular acceleration of this movement in this plane (a·x +b·y+c·z+d=0) is explained below:

Here, a vector P(xi, yi, zi) is a vector in a real vector space (x, y, z), which is not an imaginary vector space F. Assuming that the a second plane is a plane parallel to this plane (a·x+b·y+c·z+d=0) and the origin of this real vector space is included in the second plane. The distance D(i) between the measured position of the club head and the second plane can be calculated from the measured valued d(i). D(i) is a scalar quantity. The direction cosine N of the second plane in the real vector space is proportional to (a, b, c), namely N=k(a, b, c). Where k is a normalizing factor and is expressed as follows:

$$k = (a^2 + b^2 + c^2)^{-1/2} \quad (I3)$$

A vector Q of a point, which is an intersection of the second plane (a·x+b·y+c·z+d=0) and a normal line of the second plane passing through the vector P can be expressed as follows:

$$Q(i) = P(i) - D(i) \cdot N \quad (I4)$$

Setting a reference vector Q, for example Q(1), and calculating an inner product (i.e., scalar product) <Q(1) Q(i)> of the vectors Q(1) and Q(i), the angle θ(i) between those vectors can be calculated from the proportion r of the product of the absolute value of these vectors |Q(1)|·|Q(i)| and the inner product:

$$r = <Q(1) \cdot Q(i)> / |Q(1)| \cdot |Q(i)| \theta(i) = \cos^{-1} r \quad (I5)$$

When the following mathematical model is supposed, $$\theta = a + b \cdot t + c \cdot t^2 \quad (I6)$$

the coefficients a, b, c can be determined, selecting a candidate mathematical relation, which is composed of the following base functions g1, g2, g3, and g4, and applying the method according to the present invention:

g1=θ(i), g2=1, g3=t, g4=$t^2$

When the coefficients a, b, c of (I6) are determined, the angular velocity and the angular acceleration can be calculated Next, we consider a third model #3), in which the center of the ellipsoid moves. With time t according to a first order function of time t, and also the size changes with time t according to a first order function of time t, and a fourth model #4), in which the direction cosine (a, b, c) changes with time t according to a first order function, and also the distance g changes with time t according to a first order function of time t.

3)

$$p \cdot (x \cdot a0 + a0 + a1 \cdot t) + q \cdot (y \cdot b0 + b2t)^2 + r \cdot (z \cdot c0 + c \cdot t)^2 - (r0 + r \cdot t) = 0 \quad (I7)$$

4)

$$(a + b \cdot t) \cdot x + (c + d \cdot t) \cdot y + (e + f \cdot t) \cdot z - (g + h \cdot t) = 0 \quad (I8)$$

The parameters of the model #43) can be determined by selecting a candidate mathematical relation, corresponding to the following base functions:

f1=$x^2$, f2=$y^2$, f3=$z^2$, f4=$t^2$, f5=x, f6=y, f7=z, f8=t, f9=x·t, f10=y·t, f11=z·t, f12=1

The parameters of the model #4) can be determined by selecting a candidate mathematical relation, corresponding to the following base functions:

f1=x, f2=y, f3=z, f4=t, f5=t·x, f6=t·t, t7=t·z, f8=1

J. <An Example of Identification of a Differential Equation From Measured Data>

Assuming that it is known that the measure data d=(x, y) can expressed by the following expression:

$$a \cdot dy/dx + b \cdot y + c \cdot y^2 + d \cdot x + e \cdot x^2 + f \cdot 1 = 0 \quad (J1)$$

The parameters a, b, c, d, e, f can be determined by selecting following base functions f1, f2, . . . , f6:

f1=dy/dx=(y(i)−y(i−1))/t(i)−t(i−1)

f2=y=y(i)

f3=$y^2$=y(i)$^2$ f4=x=x(i)

f6=x=x(i)$^2$ f6=1

The candidate mathematical relation is:

$$a \cdot f1 + b \cdot f2 + c \cdot f3 + d \cdot f4 + e \cdot f5 + f \cdot f6 = 0$$

The parameters a, b, c, d, e, f can be determined from the direction cosine in a vector space spanned by these base functions. However this method is applicable only when the density of data is sufficiently thick for neglecting the errors caused by the approximation of the derivative by a division.

What is claimed is:

1. An apparatus for identifying a mathematical relation between base variables (x1, x2, . . . ,xp), when a set of input data d is composed of p base variables (x1, x2, . . . ,xp), and a plurality of data set d(i) of such a data set d is inputted, the data sets d(i) are distinguished by an input data distinguishing parameter i, comprising:

a data acquisition means for acquiring values xji of base variables xj(j=1, . . . ,p) in sets of input data d(i) (i=1, 2, . . . ,n), which are distinguished by the input data distinguishing parameter i;

a base function defining means for selecting a mathematical function program (m=k), which is one of the mathematical function programs gm distinguished by a mathematical function specifying parameter m, the mathematical function programs output a function value corresponding to their input references, the base function defining means defines a base functions fk, by specifying a base variable to each of one or more than one input references of the selected mathematical function program fk;

a candidate mathematical relation specifying means, which specifies a candidate mathematical relation, by specifying a plurality of base functions fk (k=1, 2, . . . , q) from the base functions defined by the base function defining means;

a vector component acquisition means for sending the values of the base variables acquired by said data acquisition means, to each of the input references of base functions fk (k=1, . . . q) included in the candidate mathematical relation specifying means, which is defined by the candidate mathematical relation, for each data set d(i), and for acquiring and storing the output value Fki of the base functions fk into an array VC_ARRAY, in which the values of the functions Fki are stored in a form of a vector F(i) in a q dimensional space, for each input data specifying parameter i;

a direction cosine acquisition means for acquiring the direction cosine (L1, . . . , Lq) of a mapping plane spanned by the points P(i) in a vector space which correspond to the vectors stored in the vector component array VC_ARRAY, wherein the direction cosine acquisition means comprises:

a correlation sum calculating means for calculating the correlation sum <a|b> of the vector component array VE_ARRAY;

an eignevalue calculating means for calculating the minimum eigenvalue among the eigenvalues $\lambda(1), \ldots, \lambda(q)$ of a correlation sum matrix, the elements of which are correlation sums <a|b>;

and an eigenvector calculating means, which calculates the eigenvector corresponding to the minimum eignevalue, and outputs the eigenvector as the direction cosine (L1, . . . ,Lq);

and a mathematical relation outputting means for outputting a mathematical relation corresponding to the following expression or an mathematical expression or values, which can be deduced from the following expression, when the direction cosine of the plane corresponding to each base function is Lk(k=1, 2, . . . , q):

$$\sum_{k=1}^{q} (Lk \times fk) = 0.$$

2. An apparatus for identifying a mathematical relation according to claim 1, wherein the eigenvalue calculating means multiplies a weighting $Wi^2$ to the product of elements Fai and Fbi in the array VC_ARRAY, then obtains the sum of them in respect with the parameter i to obtain the correlation sum <a|b>

$<a|b> = \Sigma Wi \cdot (Fai \times Fbi)$.

3. An apparatus for identifying a mathematical relation according to claim 1, further comprising:

a validity estimating means for judging whether the obtained eigenvalue is larger than a predetermined value or not;

and a control program stored in a file which controls so that when the validity estimating means does not estimate that the eigenvalue is smaller than the predetermined value, the candidate mathematical relation specifying means selects another candidate mathematical relation, and when the validity estimating means estimates that the eigenvalue is smaller than the predetermined value, and the direction cosine corresponding to each of the base functions is Lk, the mathematical relation outputting means outputs a mathematical relation corresponding to the following mathematical relation of deduced from the mathematical relation $$\sum_{k=1}^{q} (Lk \times fk) = 0.$$

4. An apparatus for identifying a mathematical relation according to claim 1, wherein the apparatus is incorporated in a measuring apparatus, and used as an apparatus for interpolating or extrapolating data.

5. An apparatus for identifying a mathematical relation according to claim 1, wherein the apparatus is incorporated in an apparatus for identifying trajectories of a moving object, and acquires input data of position as a function of a time parameter i, then outputs one or a plurality of mathematical relation(s), for identifying the trajectory of the moving object.

6. An apparatus for identifying a mathematical relation according to claim 1, wherein the apparatus is incorporated in an apparatus for identifying a form of a curve or a surface, and acquires input data of coordinates of infinite points on the curve or the surface, then outputs one or a plurality of mathematical relation(s), for identifying the form of the curve or the surface.

7. An apparatus for identifying a mathematical relation according to claim 6, wherein the form of curve or surface is a form of an object, and coordinates of points on the object are given as input data d(i).

8. An apparatus for identifying a mathematical relation according to claim 6, wherein the form of curve or surface is a form of curve or surface in an abstract space, which represents a mathematical relation of variables, and values of the variables are given as input data d(i).

9. An apparatus for identifying a mathematical relation according to claim 1, further comprising a memory media, which can be read out by a computer.

10. An apparatus for identifying a mathematical relation according to claim 9, wherein said memory media includes:

a data acquisition program stored in a file for acquiring sets of input data d(i);

a plurality of mathematical function program stored in a file which can output a function value corresponding to a set of its input variables;

a base function defining program stored in a file for defining base functions and/or defined base functions;

a candidate mathematical relation specifying program stored in a file for specifying a candidate mathematical relation and/or a set of base functions as a specified candidate mathematical relation;

a vector component acquisition program stored in a file, which sends the values of base variables to the input references of the base functions fk (k=1, . . . ,q) included in the candidate mathematical relation specified by the candidate mathematical relation specifying program, for each input data specifying parameter i, and acquires the value Fki of the base function to store a vector F(i), the component of which is the function values Fki (k=1, . . . ,q), into a vector component array VC_ARRAY, for each input data specifying parameter i;

a direction cosine acquiring program stored in a file, which acquires the direction cosine of a mapping plane corresponding to the vectors F(i) in the vector component array VC_ARRAY; and a mathematical relation outputting program stored in file for outputting a mathematical relation, which corresponds to the following expression, when the direction cosine corresponding to each of the base functions fk is Lk (k=1, . . . , q):

$$\sum_{k=1}^{q} (Lk \times fk) = 0.$$

11. A method for identifying a mathematical relation between base variables (x1, x2, . . . ,xp), when a set of input data d is composed of p base variables (x1, x2, . . . ,xp), and a plurality of data set d(i) of such a data set d is inputted, the data sets d(i) are distinguished by an input data distinguishing parameter i, which comprises the steps of:

acquiring the values xji of base variables xj (j=1, . . . ,p) in sets of input data d(i) (i=1, 2, . . . ,n), which are distinguished by the input data distinguishing parameter i;

selecting a mathematical function program (m=k), which is one of the mathematical function programs gm distinguished by a mathematical function specifying parameter m, the mathematical function programs output a function value corresponding to their input references;

defining a base functions fk by specifying a base variable to each of one or more than one input references of the selected mathematical function program fk;

after defining a base functions fk, specifying a candidate mathematical relation, by specifying a plurality of base functions fk (k=1, 2, . . . ,q) from the base functions;

after acquiring the values of xji of base variables, sending the values of the base variables, to each of the input references of base functions fk (k=1, . . . q) included in the candidate mathematical relation, which is defined by the sending step, for each data set d(i), and for acquiring and storing the output value Fki of the base functions fk into an array VC_ARRAY, in which the values of the functions Fki are stored in a form of a vector F(i) in a q dimensional space, for each input data specifying parameter i;

obtaining the direction cosine (L1, . . . , Lq) of a mapping plane spanned by the points P(i) in a vector space which correspond to the vectors stored in the vector component array VC_ARRAY, wherein the direction cosine acquisition procedure calculates the correlation sum <a|b> of the vector component array VE_ARRAY, then calculates the minimum eigenvalue among the eigenvalues 1 (1), . . . , 1 (q) of a correlation sum matrix, the elements of which are correlation sums <a|b>, and finally calculates the eigenvector corresponding to the minimum eignevalue, and outputs the eigenvector as the direction cosine (L1, . . . ,Lq); and outputting a mathematical relation corresponding to the following expression or an mathematical expression or values, which can be deduced from the following expression, when the direction cosine of the plane corresponding to each base function is Lk (k=1, 2, . . . , q):

$$\sum_{k=1}^{q} (Lk \times fk) = 0.$$

* * * * *